(12) United States Patent
Cahall

(10) Patent No.: US 6,795,650 B2
(45) Date of Patent: Sep. 21, 2004

(54) CAMERA HAVING SHARED OPTICS FOR OPTICAL VIEWFINDING AND FOR ELECTRONIC CAPTURE AND DISPLAY

(75) Inventor: Scott C. Cahall, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 156 days.

(21) Appl. No.: 10/317,482

(22) Filed: Dec. 12, 2002

(65) Prior Publication Data

US 2004/0114918 A1 Jun. 17, 2004

(51) Int. Cl.[7] .................. G03B 13/02; G03B 13/08; G03B 17/00; H04N 5/222; H04N 5/225
(52) U.S. Cl. .................. 396/374; 396/383; 396/384; 396/386; 396/447; 348/333.01; 348/333.09; 348/333.11; 348/341
(58) Field of Search ................ 396/374, 373, 396/383, 384, 385, 386, 148, 150, 151, 152, 141, 352, 353, 354, 296, 84, 447; 348/333.01, 333.06, 333.08, 333.09, 333.11, 341, 344

(56) References Cited

U.S. PATENT DOCUMENTS

| | | | |
|---|---|---|---|
| 366,584 A | 7/1887 | Higgins | 396/383 |
| 1,310,776 A | 7/1919 | Akeley | 352/139 |
| 2,282,045 A | 5/1942 | Fleischer | 396/155 |
| 2,305,978 A | 12/1942 | Melcher | 352/206 |
| 2,709,391 A | 5/1955 | Reeves | 352/206 |
| 3,819,255 A | 6/1974 | Matui | 359/836 |
| 4,420,773 A | 12/1983 | Toyoda et al. | 386/118 |
| 5,034,764 A | 7/1991 | Inabata | 396/383 |
| 5,099,265 A | 3/1992 | Lee | 396/374 |
| 5,146,253 A | 9/1992 | Swayze | 396/349 |
| 5,161,025 A | 11/1992 | Nakao | 348/333.05 |
| 5,253,002 A | 10/1993 | Kwak | 396/176 |
| 5,557,458 A | 9/1996 | Itoh | 359/434 |
| 5,581,318 A | 12/1996 | Shiratori | 396/296 |
| 5,678,080 A | 10/1997 | Miyamoto | 396/267 |
| 5,682,564 A | 10/1997 | Tsuboi | 396/387 |
| 5,701,535 A | 12/1997 | Reibl | 396/373 |
| 5,784,656 A | 7/1998 | Utagawa | 396/272 |
| 5,966,553 A | 10/1999 | Nishitani et al. | 396/303 |
| 6,330,400 B1 * | 12/2001 | Bittner et al. | 396/72 |

* cited by examiner

Primary Examiner—Russell Adams
Assistant Examiner—Rochelle Blackman
(74) Attorney, Agent, or Firm—Robert Luke Walker

(57) ABSTRACT

An optical and electronic viewer of a camera has a body having entrance and exit openings and entrance and exit tunnels extending inward from respective openings. The body has a cross tunnel connecting the entrance and exit tunnels. An eyepiece is mounted at the exit opening and defines and eyepiece axis. An objective lens is mounted at the entrance opening and defines an objective axis. An electronic imager is disposed within the body, in optical alignment with the objective lens. A microdisplay is mounted in the exit tunnel interior to the eyepiece. First and second reflectors are disposed in the cross tunnel. The reflectors are aligned and are each movable, within the cross tunnel, between an optical-viewing position and a non-viewing position. The first reflector is aligned with the objective axis and the second reflector is aligned with the eyepiece axis in optical-viewing position. The reflectors are spaced from the axes and each other in non-viewing position.

39 Claims, 15 Drawing Sheets

CAMERA HAVING SHARED OPTICS FOR OPTICAL VIEWFINDING AND FOR ELECTRONIC CAPTURE AND DISPLAY

FIELD OF THE INVENTION

The invention relates to photography and photographic cameras and equipment and more particularly relates to a camera having shared optics for optical viewfinding and for electronic capture and display.

BACKGROUND OF THE INVENTION

Cameras have long been available that rearrange light paths by moving a reflector. Single lens reflex cameras operate on this principle, using a mirror as a movable reflector. Other cameras have been disclosed that rearrange light paths using a prism rather than a mirror.

U.S. Pat. Nos. 4,420,773 and 5,099,265 disclose cameras having an electronic-optical viewfinder in which a mirror is moved to a first position to direct light straight through an optical viewfinder and to a second position to redirect light from an internal display to the viewfinder eyepiece. These cameras have separate optical systems for image capture.

U.S. Pat. No. 5,966,553 discloses a camera in which a prism is moved to between a first position directing light to an eyepiece and second position, in which the movable prism is out of the light path and the light is directed to an electronic imager. Images captured by the electronic imager can be shown on a display on the outside of the camera This patent shares some optics, but does not utilize an internal display.

U.S. Pat. Nos. 5,005,955 and 5,034,763 disclose optical systems for real image viewfinders.

It would thus be desirable to provide an improved camera in which optical viewfinding and electronic image capture and display share optical components.

SUMMARY OF THE INVENTION

The invention is defined by the claims. The invention, in its broader aspects, provides an optical and electronic viewer of a camera that has a body having entrance and exit openings and entrance and exit tunnels extending inward from respective openings. The body has a cross tunnel connecting the entrance and exit tunnels. An eyepiece is mounted at the exit opening and defines an eyepiece axis. An objective lens is mounted at the entrance opening and defines an objective axis. An electronic imager is disposed within the body, in optical alignment with the objective lens. A microdisplay is mounted in the exit tunnel interior to the eyepiece. First and second reflectors are disposed in the cross tunnel. The reflectors are aligned and are each movable, within the cross tunnel, between an optical-viewing position and a non-viewing position. The first reflector is aligned with the objective axis and the second reflector is aligned with the eyepiece axis in optical-viewing position. The reflectors are spaced from the axes and each other in non-viewing position.

It is an advantageous effect of the invention that an improved camera is provided, in which optical viewfinding and electronic image capture and display share optical components.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
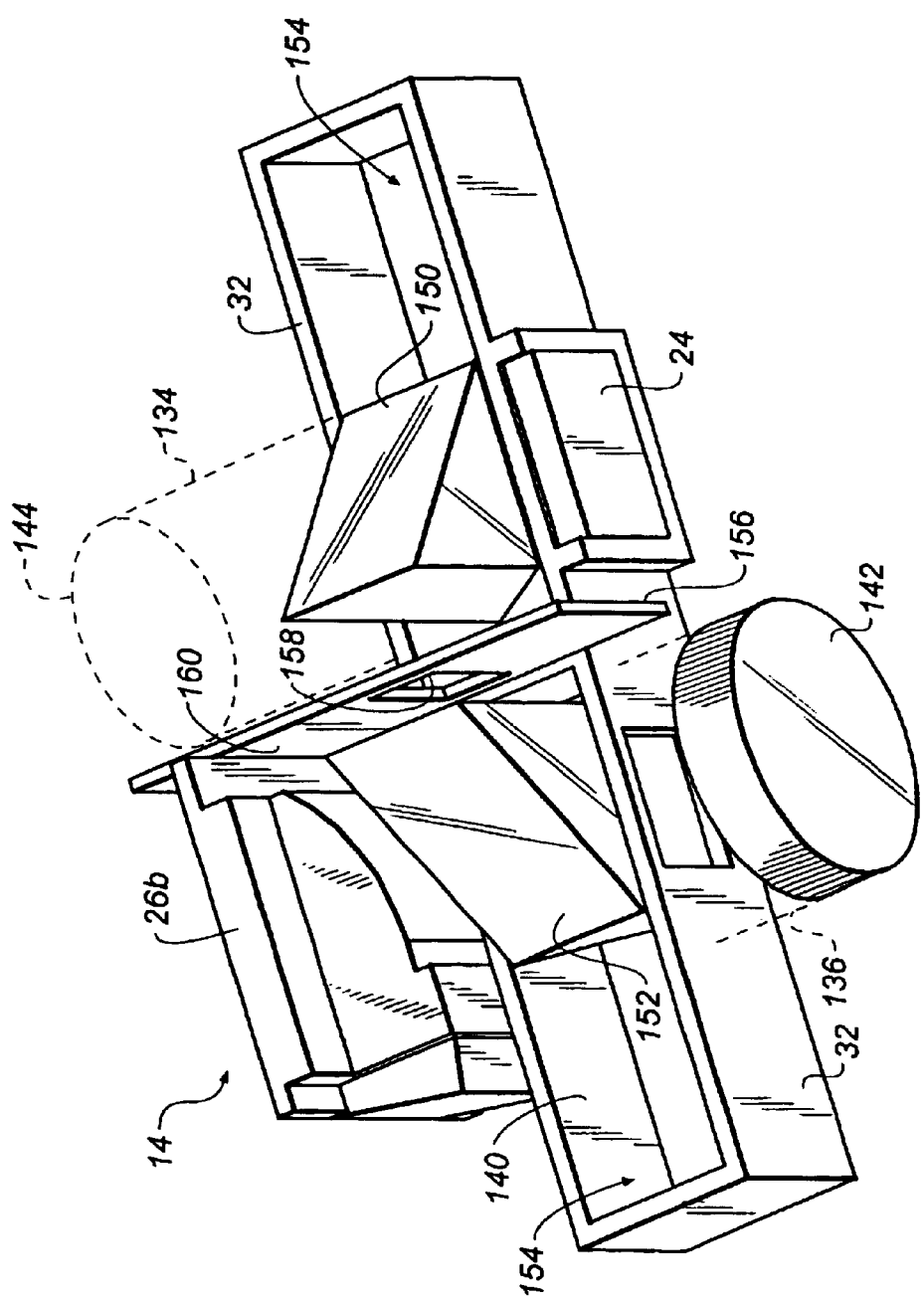
FIG. 1 is a semi-diagrammatical top perspective view of an embodiment of the viewer. Parts of the entrance and exit tunnels are indicated by dashed lines. The objective lens is also indicated by dashed lines. The reflectors are shown in optical-viewing position. Only part of the chassis is shown.
Figure 2:
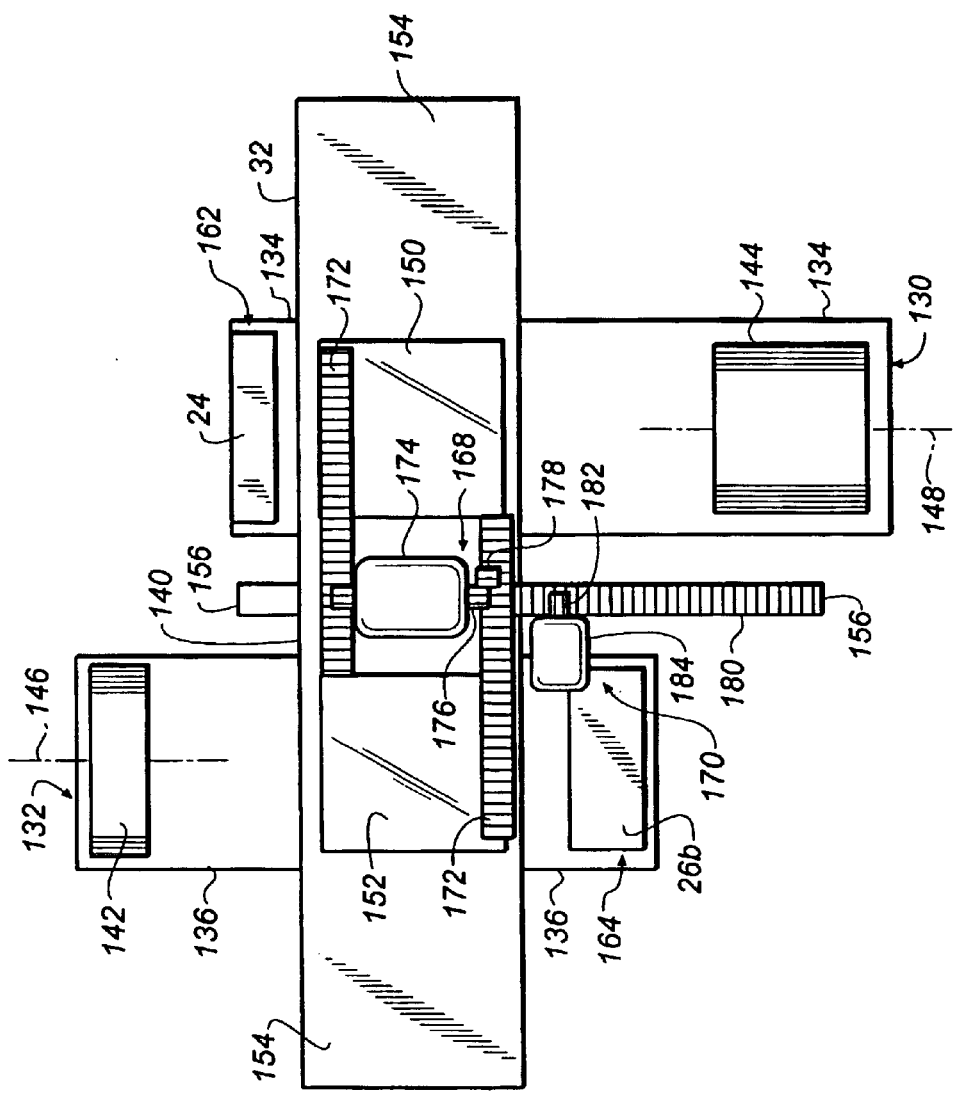
FIG. 2 is a semi-diagrammatical bottom view of the viewer of FIG. 1. The reflectors are shown in optical-viewing position.

In the following, feature sets of different viewers and cameras and methods are discussed in terms of particular embodiments combining all or many of those features. In those embodiments, the viewer is part of a camera, such as, a hybrid film-electronic capture camera Some alternative embodiments combining fewer features and alternative features are also discussed herein. Other alternatives will be apparent to those of skill in the art. For example, film capture features of the hybrid cameras discussed herein can be deleted or replaced with a second electronic capture system. Likewise, optical components can be modified by changes in numbers of elements, and the like.

The camera 10 has a body 12 that holds the viewer 14. The body 12 also holds additional components that, with the viewer 14, provide an electronic capture unit 16. The camera 10 can include an additional capture unit. The second capture unit captures the scene image electronically or on photographic film. The two different capture units can take a variety of forms and can be completely separate from each other or can share some or most components.

The capture unit or units provide two different kinds of images: evaluation images intended for temporary use immediately after image capture and archival images intended for longer-term storage and use. The evaluation images are captured electronically. The archival images can be captured electronically or on film, depending upon camera features.

Referring now to FIGS. 14–17, cameras 10 are mostly discussed herein in relation to a hybrid film-digital embodiment, in which a film capture unit 18 can capture archival images using photographic film 20 as the archival media. The electronic image capture unit 16 captures electronic images that are used as evaluation images and can optionally capture electronic images for use as archival images. When the photographer trips a shutter release 22 and the camera 10 is set for hybrid capture, a subject image (a light image of a scene) is captured as a latent image on a frame of the film 20 and at least one electronic image is captured on an electronic array imager 24. The electronic image is digitally processed and used to provide an evaluation image that can be shown on an image display 26 mounted to the body 12 and/or stored as an archival image. The camera 10 can also have an archival capture unit that uses a separate taking lens to direct light to an electronic capture unit 16 rather than using such a separate taking lens to direct light to a film capture unit 18. The camera can provide electronic or film capture or both, at the selection of the photographer or on the basis of available storage space in one or another capture media or on some other basis. For example, a switch (not separately illustrated) can provide for selection of a desired mode of capture.

The electronic images, as captured in analog form and after digitization, but not other modification, are referred to generically herein as "original electronic images". After further modification, the electronic images are referred to generically herein by the term "derived images". Derived images are modified relative to the original images. This can be for calibration to a display or for a particular file structure, or matching to output media. These modifications may or may not also include the addition of metadata. A derived image that is matched to the expected product of photofinishing the archival image is also referred to herein as a "verification image". More than one derived image can be made from a single original electronic image.

The electronic imager 24 is driven by an imager driver 25. The electronic array imager 24 is configured so as to capture, for each picture-taking event, one or more electronic images that correspond to a latent image concurrently captured on the filmstrip 20. The type of imager 24 used may vary, but it is highly preferred that the imager 24 be one of the several solid-state imagers available.

One highly popular type of solid-state imager commonly used is the charge coupled device ("CCD"). Of the several CCD types available, two allow easy electronic shuttering and thereby are preferable in this use. The first of these, the frame transfer CCD, allows charge generation due to photoactivity and then shifts all of the image charge into a light shielded, non-photosensitive area. This area is then clocked out to provide a sampled electronic image. The second type, the interline transfer CCD, also performs shuttering by shifting the charge, but shifts charge to an area above or below each image line so that there are as many storage areas as there are imaging lines. The storage lines are then shifted out in an appropriate manner. Each of these CCD imagers has both advantages and disadvantages, but all will work in this application. A typical CCD has separate components that act as clock drivers, analog signal processor-analog/digital converter 104 (also referred to as "A/D converter 104").

It is also possible to use an electronic image sensor manufactured with CMOS technology. This type of imager is attractive for use, since it is manufactured easily in a readily available solid-state process and lends itself to use with a single power supply. In addition, the process allows peripheral circuitry to be integrated onto the same semiconductor die. For example, a CMOS sensor can include clock drivers, the AID converter 104, and other components integrated on a single IC.

A third type of sensor which can be used is a charge injection device (CID). This sensor differs from the others mentioned in that the charge is not shifted out of the device to be read. Reading is accomplished by shifting charge within the pixel. This allows a nondestructive read of any pixel in the array. If the device is externally shuttered, the array can be read repeatedly without destroying the image. Shuttering can be accomplished by external shutter or, without an external shutter, by injecting the charge into the substrate for recombination.

The electronic image capture unit captures a three-color image. It is highly preferred that a single imager be used along with a three-color or four color filter, however, multiple monochromatic imagers and filters can be used. Suitable three-color filters are well known to those of skill in the art, and are normally incorporated with the imager to provide an integral component. For convenience, the camera 10 is generally discussed herein in relation to embodiments having a single imager 24 with a three color filter (not separately illustrated). It will be understood that like considerations apply to cameras 10 using more than three colors as well as cameras 10 using monochromatic imagers.

Figure 18:
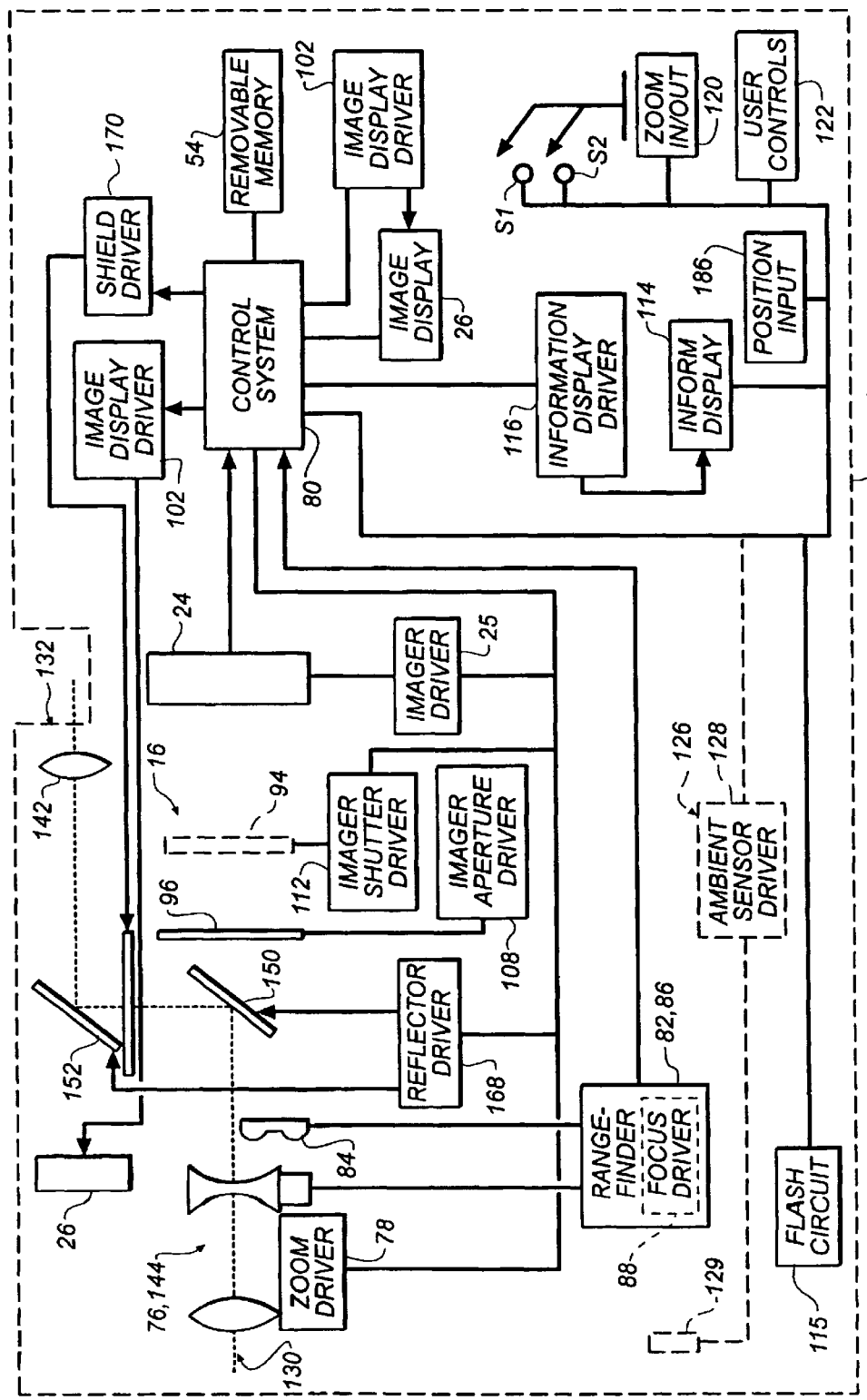
FIG. 18 is a schematic diagram of another embodiment of the camera. The reflectors are in optical-viewing position.

Referring to FIG. 18, in some embodiments the camera 10 has a single electronic capture unit 16 that captures evaluation and archival images electronically. Evaluation images can be subsampled from the original electronic image so as to provide lower resolution images. The lower resolution derived images can be provided using the method described in commonly-assigned U.S. Pat. No. 5,164,831, entitled "ELECTRONIC STILL CAMERA 10 PROVIDING MULTI-FORMAT STORAGE OF FULL AND REDUCED RESOLUTION IMAGES", to Kuchta, et. al.

Two electronic capture units 16 can be present in the camera 10, with one used as the evaluation capture unit and the other used as the archival capture unit. An example of a suitable digital camera having two such electronic capture units is described in U.S. Pat. No. 5,926,218, entitled "ELECTRONIC CAMERA 10 WITH DUAL RESOLUTION SENSORS", to Smith.

Figure 14:
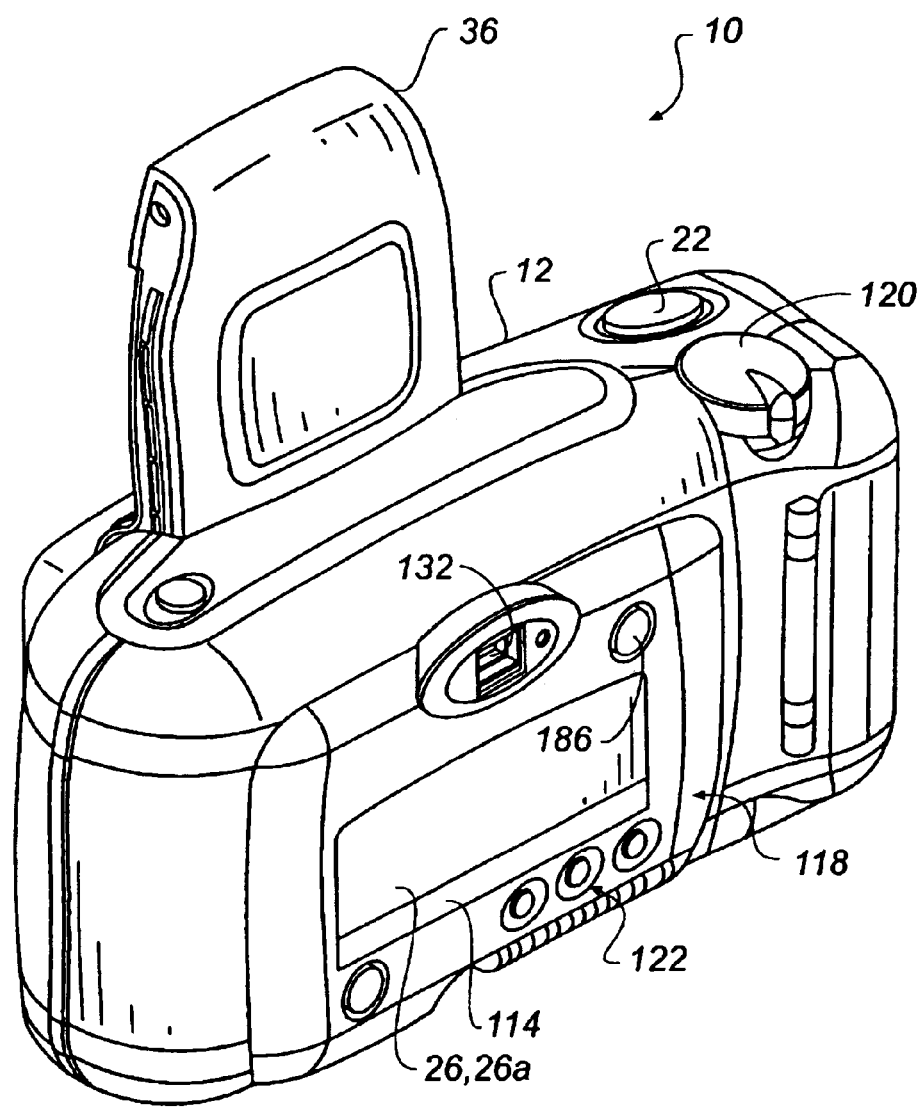
FIG. 14 is an exploded perspective view of an embodiment of the camera.
Figure 15:
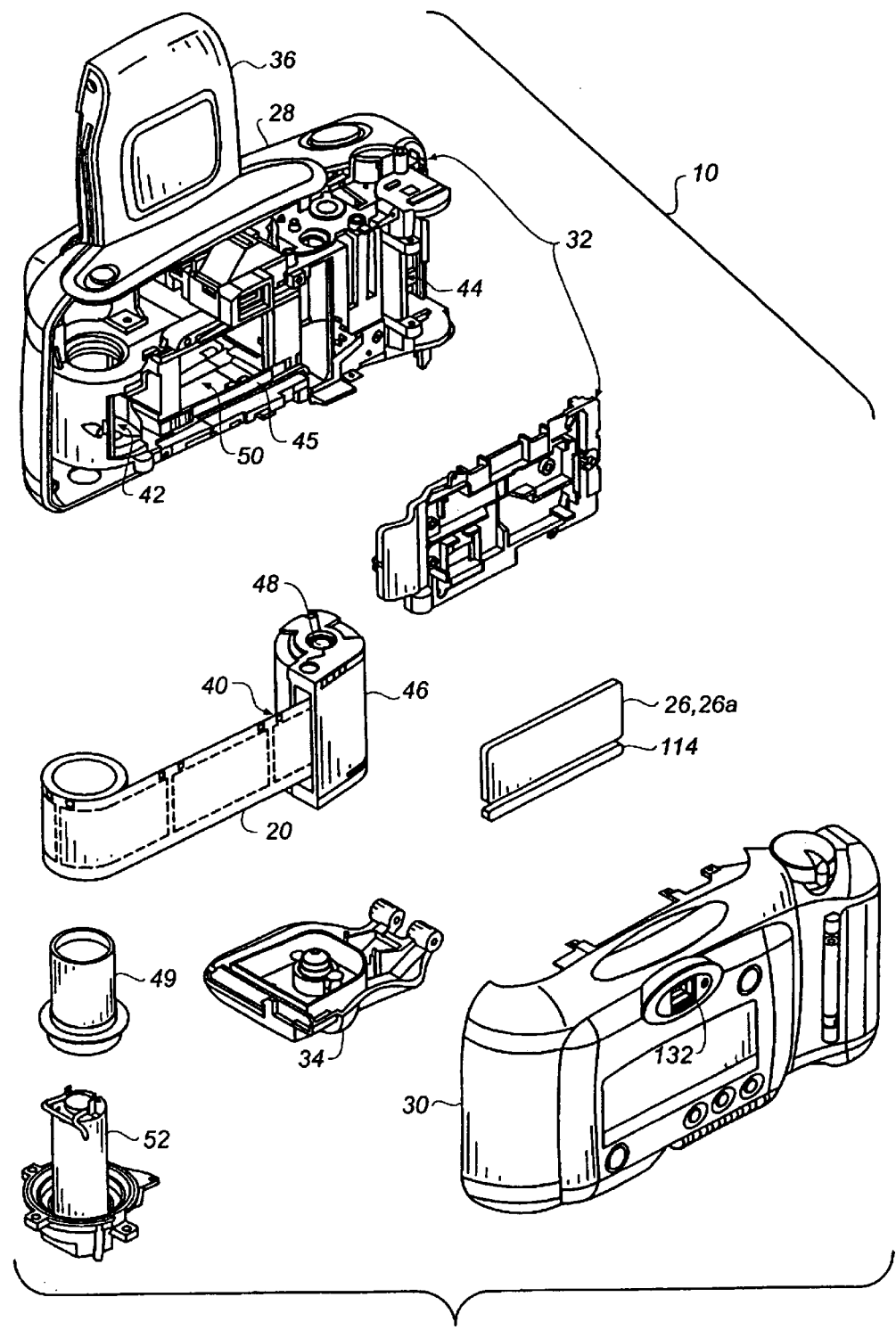
FIG. 15 is a rear perspective view of the camera of FIG. 14.

Referring now to FIGS. 14–15, the camera body 12 provides structural support and protection for the capture units 16,18 and other components. The body 12 of the camera 10 can be varied to meet requirements of a particular use and style considerations. In some embodiments, the body 12 has front and rear covers 28,30 joined together over a chassis or frame 32. Many of the components of the camera 10 can be mounted to the chassis 32. A film door 34 and a flip-up flash unit 36 are pivotably joined to the covers 28,30 and chassis 32.

The film image capture unit 16 has a film holder 38 that holds a film unit 40 during use. In the camera 10 of FIGS. 7–8, the film holder 38 is part of the chassis 32. (The term "film unit 40" is used to refer to photographic film 20 and any accompanying canister or other support structure/light shield.)

The configuration of the film holder 38 is a function of the type of film unit 40 used. The type of film unit 40 used is not critical. The camera 10 shown in the figures is film reloadable and uses an Advanced Photo System ("APS") film cartridge. Other types of one or two chamber film cartridge could also be used and roll film can also be used. It is currently preferred that the camera 10 is reloadable. The camera 10 can have a IX-DX code reader (not shown) to determine the film type and a data recorder 39 to write data on the film indicating how many prints of each film frame to produce, print format, and the like. This is not limiting. Information including metadata can be read and written by any means well known to those of skill in the art.

The film holder 38 includes a pair of film chambers 42,44 and an exposure frame 45 between the film chambers 42,44. The film unit 40 has a canister 46 disposed in one of the chambers. A filmstrip 20 is wound around a spool 48 held by the canister 46. During use, the filmstrip 20 extends across the exposure frame 45 and is wound into a film roll in the other chamber. The exposure frame 45 has an opening 50 through which a light image exposes a frame of the film 20 at each picture taking event.

During use, the filmstrip 20 is moved by a film transport 52 out of the canister 46 of the film cartridge 40, is wound into a film roll in the supply chamber 44, and is then returned to the canister 46. The film transport 52, as illustrated, includes an electric motor located within a supply spool 49, but other types of motorized transport mechanisms and manual transports can also be used. Filmstrip exposure can be on film advance or on rewind.

The camera 10 has a taking lens 76 mounted in the body 12. The taking lens 76 directs light to the exposure frame 45. The taking lens 76 can be simple, such as having a single focal length and manual focusing or a fixed focus, but this is not preferred. In the embodiment shown in FIG. 14, the taking lens 76 is a motorized zoom lens in which a mobile element or elements are driven, relative to a stationary element or elements, by a zoom driver 78.

The taking lens 76 of the embodiment of FIG. 14 is also autofocusing. An autofocusing system 82 has a rangefinder 86 that includes a sensor 84. The rangefinder 86 operates a focus driver 88, directly or through the control system 80, to move one or more focusable elements (not separately illustrated) of the taking lens 76. The rangefinder 86 can be passive or active or a combination of the two.

A film shutter 92 shutters the light path to the exposure frame 45. An imager shutter 94 shutters the light path to the imager 24. Diaphragms/aperture plates 96 can also be provided in both of the paths. Each of the shutters 92,94 is switchable between an open state and a closed state. The term "shutter" is used in a broad sense to refer to physical and/or logical elements that provide the function of allowing the passage of light along a light path to a filmstrip or imager for image capture and disallowing that passage at other times. "Shutter" is thus inclusive of, but not limited to, mechanical and electromechanical shutters of all types. "Shutter" is not inclusive of film transports and like mechanisms that simply move film or an imager in and out of the light path. "Shutter" is inclusive of computer software and hardware features of electronic array imagers that allow an imaging operation to be started and stopped under control of the camera 10 controller.

In currently preferred embodiments, the film shutter 92 is mechanical or electromechanical and the imager shutter 94 is mechanical or electronic. The imager shutter 94 is illustrated by dashed lines to indicate both the position of a mechanical imager shutter and the function of an electronic shutter. When using a CCD, electronic shuttering of the imager 24 can be provided by shifting the accumulated charge under a light shielded register provided at a non-photosensitive region. This may be a full frame as in a frame transfer device CCD or a horizontal line in an interline transfer device CCD. Suitable devices and procedures are well known to those of skill in the art. When using a CID, the charge on each pixel is injected into a substrate at the beginning of the exposure. At the end of the exposure, the charge in each pixel is read. The difficulty encountered here is that the first pixel read has less exposure time than the last pixel read. The amount of difference is the time required to read the entire array. This may or may not be significant depending upon the total exposure time and the maximum time needed to read the entire array.

CMOS imagers are commonly shuttered by a method called a rolling shutter. CMOS imagers using this method are not preferred, since this shutters each individual line to a common shutter time, but the exposure time for each line begins sequentially. This means that even with a short exposure time, moving objects will be distorted. Given horizontal motion, vertical features will image diagonally due to the temporal differences in the line-by-line exposure. Another method for shuttering CMOS imagers is described in U.S. Pat. No. 5,986,297. In this method, called single frame capture mode, all pixels are allowed to integrate charge during the exposure time. At the end of the exposure time, all pixels are simultaneously transferred to the floating diffusion of the device. At this point sequential read out by lines is possible.

Signal lines 98 electronically connect the imager 24 through the control system 80 to the image display 26. The imager 24 receives a light image and converts the light image to an analog electrical signal, that is, an analog electronic image. (For convenience, electronic images are generally discussed herein in the singular. Like considerations apply to each image of a plurality captured for a particular picture taking event.)

The image display or displays 26 are driven by an image display driver 102 and produce a light image (also referred to here as a "display image") that is viewed by the user. In some embodiments, the image display 26a is mounted on the outside of the camera body 12. In other embodiments, a microdisplay 26b located inside the camera body 12 is used in addition to or in place of the external display. (For convenience, the image display is generally discussed herein in relation to a camera 10 having a single display.)

The microdisplay 26b illustrated in FIG. 1 is a reflective liquid crystal display (LCD). It is shown with a curved polarizing beam splitter (PBS) immediately in front of it. This PBS allows illumination light of one polarization to be delivered onto the LCD from the front. It then allows light of an orthogonal polarization, reflected from the LCD, to pass through and eventually reach the eye.

The precise configuration of the PBS shown in FIG. 1 is inconsequential to the ideas and claims disclosed in this patent. The one shown here is characteristic of a particular manufacturer, but others from other manufacturers may be curved differently, may be flat but angled relative to the display, may not be polarization dependent, or may be configured in any other suitable way to effectively allow illumination and viewing from substantially the same perspective. Additionally, the optical, electronic, and mechanical systems disclosed here do not uniquely apply to this particular type of display. As such, the ideas disclosed in this patent may be applied to any type of reflective, transmissive, or emissive display.

The control system 80 controls other components of the camera 10 and performs processing related to the electronic images. The control system 80, which can take the form of an appropriately configured microcomputer, includes a controller 81, such as an embedded microprocessor having RAM or other memory for data manipulation and general program execution. The control system 80 can also include memory 54, an A/D converter 104, and an image processor 106. Suitable components for the control system 80 are known to those of skill in the art. Modifications of the control system 80 are practical, such as those described elsewhere herein. The controller 81 can be provided as a single component, such as a microprocessor, or as multiple components of equivalent function in distributed locations. The same considerations apply to the processor 106 and other components. Likewise, components illustrated as separate units herein may be conveniently combined or shared in some embodiments.

"Memory 54" refers to one or more suitably sized logical units of physical memory provided in semiconductor memory or magnetic memory, or the like. The memory 54 may be fixed in the camera 10 or removable or both removable and fixed memory can be provided. For example, the memory 54 can be an internal memory, such as a Flash EPROM memory, or alternately a removable memory, such as a CompactFlash card, or a combination of both. The type of memory 54 used and the manner of information storage, such as optical or magnetic or electronic, is not critical. For example, removable memory can be a floppy disc, a CD, a DVD, a tape cassette, or flash memory card or stick. The transfer of images in digital form can be on physical media or as a transmitted electronic signal.

The controller 81 and image processor 106 can be controlled by software stored in the same physical memory that is used for image storage, but it is preferred that the processor 106 and controller 81 are controlled by firmware stored in dedicated memory, for example, in a ROM or EPROM firmware memory. Separate dedicated units of memory can also be provided to support other functions.

The captured analog electronic image is amplified and converted by the analog to digital (A/D) converter-amplifier 104 to a digital electronic image, which is then processed in the image processor 106 and stored in the memory 54. It is currently preferred that the signal lines 98 act as a data bus connecting the imager 24, controller 81, processor 106, the image display 26, and other electronic components.

The controller 81 includes a timing generator (not separately illustrated) that supplies control signals for all electronic components in timing relationship. Calibration values for the individual camera 10 are stored in a calibration memory (not separately illustrated), such as an EEPROM, and supplied to the controller 81. The controller 81 operates the memory or memories 54 and the drivers including the zoom drivers 78, focus driver 88, imager driver 25, image display driver 102, aperture drivers 108, and film and imager shutter drivers 110,112. The controller 81 connects to a flash circuit 115 that mediates flash functions.

It will be understood that the circuits shown and described can be modified in a variety of ways well known to those of skill in the art. It will also be understood that the various features described here in terms of physical circuits can be alternatively provided as firmware or software functions or a combination of the two. Likewise, components illustrated as separate units herein may be conveniently combined or shared in some embodiments.

The digital electronic image stored in memory 54, is accessed by the processor 106 and is modified so as to provide a required derived image. As a part of showing a derived image on the image display, the camera 10 may modify the derived image for calibration to the particular display. For example, a transform can be provided that modifies each image to accommodate the different capabilities in terms of gray scale, color gamut, and white point of the display and the imager 24 and other components of the electronic capture unit 16. It is preferred that the display is selected so as to permit all of the verification image to be shown; however, more limited displays can be used. In the latter case, the displaying of the verification image includes calibration that cuts out part of the image, or contrast levels, or some other part of the information in the verification image.

The derived images can also be modified in the same manner that images are enhanced in fully digital cameras 10. For example, processing can provide interpolation and edge enhancement. A limitation here is that the derived images are intended to correspond to photofinished archival images and, thus, enhancements should be limited so as to not render the derived image dissimilar to the corresponding photofinished archival image. If the archival image is an electronic image, then comparable enhancements can be provided for both verification and archival images. Digital processing of an electronic archival image can also include modifications related to file transfer, such as, JPEG compression, and file formatting.

Enhancements can be provided to match the calibrated derived image to output characteristics of a selected photofinishing channel. Photofinishing related adjustments assume foreknowledge of the photofinishing procedures that will be followed for a particular unit of capture media This foreknowledge can be made available by limiting photofinishing options for a particular capture media unit or by standardizing all available photofinishing or by requiring the user to select a photofinishing choice, for example by entering a character on a control pad or setting a switch. This designation can then direct the usage of particular photofinishing options and can provide for a direct or indirect indication of the effect in a derived image. The application of a designation on a capture media unit could be provided by a number of means known to those in the art, such as application of a magnetic or optical code.

Derived images can be prepared from the electronic image before being needed or as needed, as desired, subject to the limitations of processing speed and available memory. To minimize the size of the memory, an electronic image can be processed and stored as a lower resolution image, before a succeeding image is read out from the imager 24.

The controller 81 facilitates the transfers of the image, along the signal lines, between the electronic components and provides other control functions, as necessary. The controller 81 includes a timing generation circuit (not separately illustrated) that produces control signals for all electronic components in timing relationship. The controller 81 is illustrated as a single component, but it will be understood that this is a matter of convenience in illustration. The controller 81 can be provided as multiple components of equivalent function in distributed locations. The same considerations apply to the processor 106 and other components. Likewise, components illustrated as separate units herein may be conveniently combined or shared in some embodiments.

A number of different types of image display 26 are available and can be used for the display or displays of the camera 10. The same type or different types of displays can be used for the microdisplay 26b and an external display 26a. The external image display 26a is preferably mounted on the back or top of the body 12, so as to be readily viewable by the photographer immediately following a picture taking. The microdisplay 26b and external display 26a differ in characteristics such as size, mounting features, and the like, relating to the particular use, but otherwise like considerations apply to both image displays. For example, the image display can be a reflective or transmissive liquid crystal display ("LCD"), a cathode ray tube display, or an organic electroluminescent display ("OELD"; also referred to as an organic light emitting display, "OLED").

One or more information displays 114 can be provided on the body 12, to present camera 10 information to the photographer, such as exposures remaining, battery state, printing format (such as C, H, or P), flash state, number of prints ordered, and the like. For convenience, the information display is generally discussed here in the singular. The information display 114 provides a variety of camera 10 related information and can include a warning message if an archival image will provide an unsuitable quality print or other final image after photofinishing, as discussed below in detail. The information display 114 and an image display 26 can be provided by separate display devices or can both be provided by contiguous parts of a common display device. The information display 114 can be deleted if information is instead provided on an image display 26 as a superimposition on the image or alternately instead of the image (not illustrated). If separate, the information display 114 is operated by an information display driver 116. Alternatively, the camera 10 can include a speaker (not shown) which provides audio warnings instead of, or in addition to, visual warnings.

In the embodiment shown in FIG. 14, an external image display 26a is mounted to the back of the body 12 and the information display 114 is mounted to the body 12 adjacent to the external image display 26a such that the two displays form part of a single user interface 118 that can be viewed by the photographer in a single glance. The information display 114 can be mounted instead or additionally (not shown) so as to be viewable through the viewfinder 58 along with the internal image display.

It is preferred that the external image display 26a is operated on demand by actuation of a switch (not separately illustrated) and that the external image display 26a is turned off by a timer or by initial depression of the shutter release 22. The timer can be provided as a function of the controller 81. The internal image display can be operated in the same manner, if a further reduction in energy usage is desired.

Figure 16:
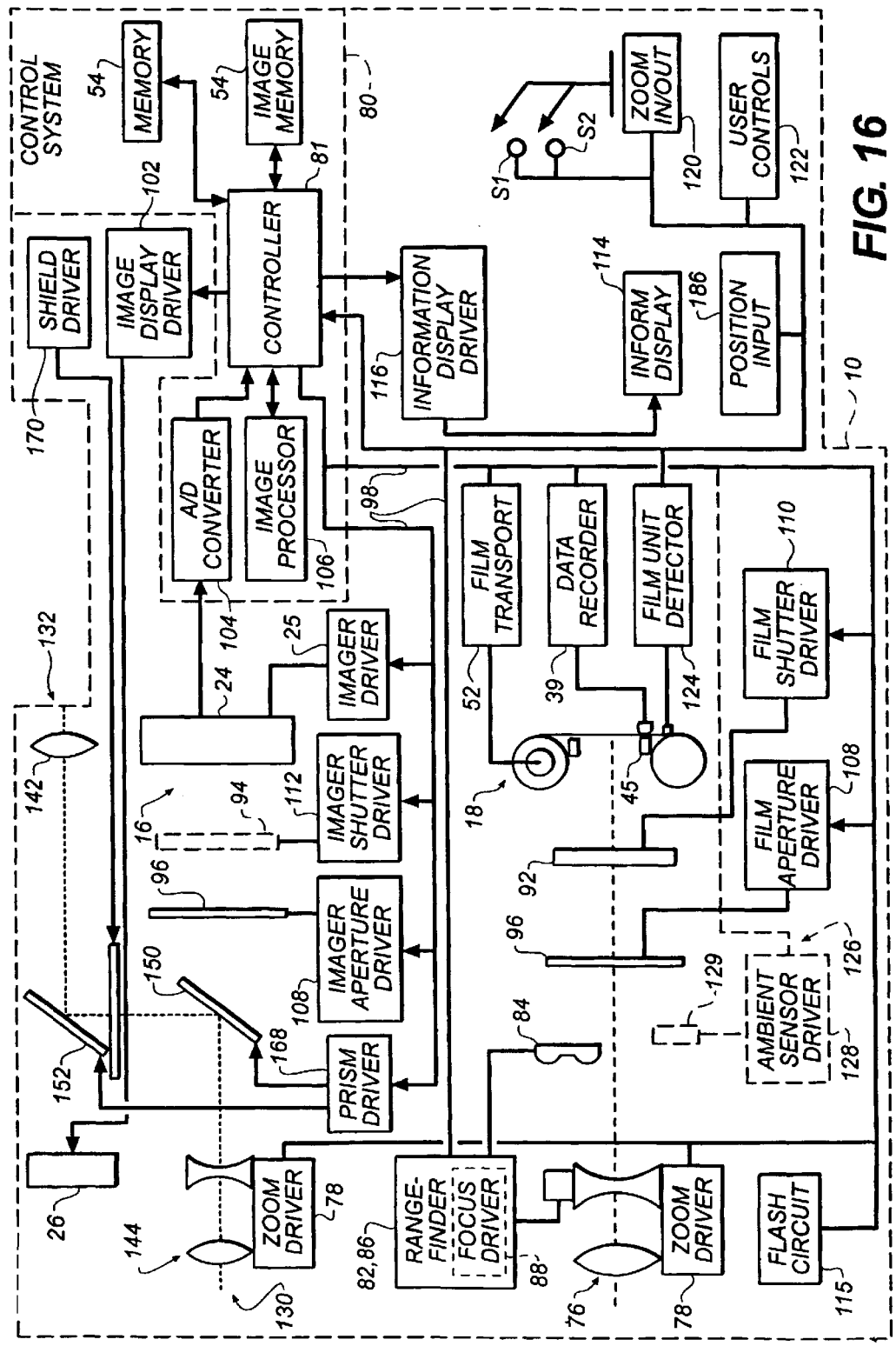
FIG. 16 is a schematic diagram of the camera of FIG. 14. The reflectors are in optical-viewing position.
Figure 17:
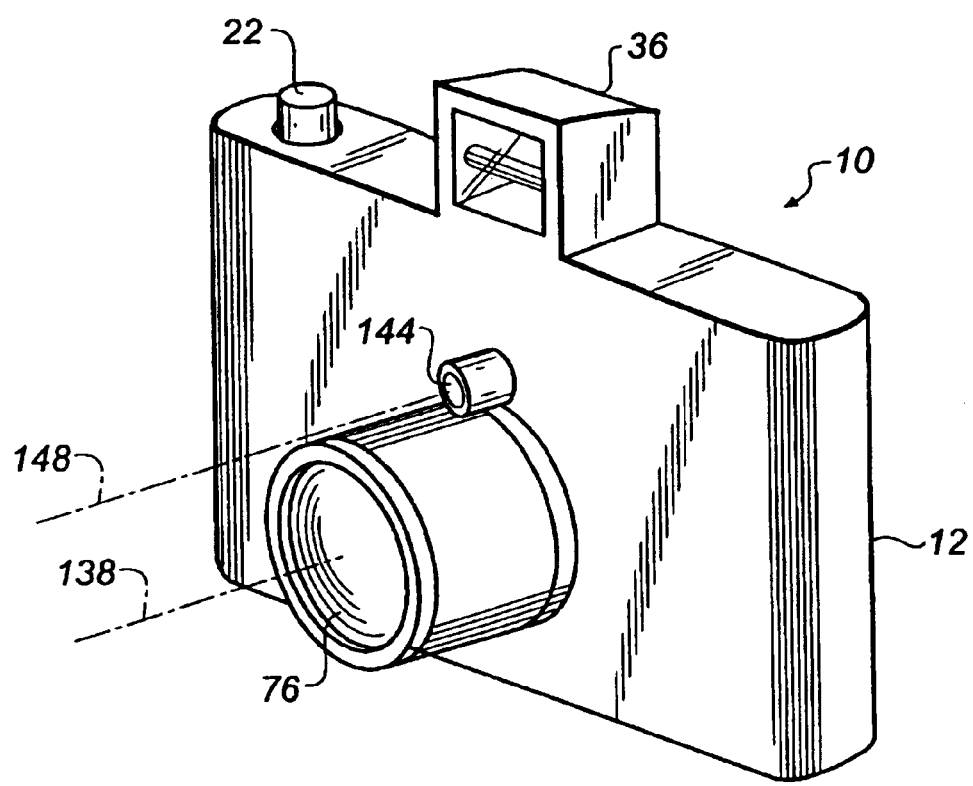
FIG. 17 is a front perspective view of a modification of the camera of the FIG. 14.

Referring now particularly to FIGS. 14–16, the user interface 118 of the camera 10 includes the shutter release 22, a "zoom in/out" button 120 that controls the zooming of the lens units, and other user controls 122 along with the image display 26 and the information display 114. The shutter release 22 operates both shutters 92,94. To take a picture, the shutter release 22 is actuated by the user and trips from a set state to an intermediate state, and then to a released state. The shutter release 22 is typically actuated by pushing, and, for convenience the shutter release 22 is generally described herein in relation to a shutter button that is initially depressed through a "first stroke", to actuate a first switch S1 and alter the shutter release 22 from the set state to the intermediate state and is further depressed through a "second stroke", to actuate a second switch S2 and alter the shutter release 22 from the intermediate state to the released state. Like other two stroke shutter releases well known in the art, the first stroke actuates exposure-delimiting camera 10 components, such as autofocus, autoexposure, and flash unit readying; and the second stroke actuates capture of the archival image.

When the shutter release 22 is pressed to the first stroke, the taking lens 76 is autofocused to a detected subject distance based on subject distance data sent by the rangefinder 86 to the controller 81. The controller 81 also receives data indicating what focal length the lens units 76 is set at from the zoom driver 78 or a zoom sensor (not shown). The camera 10 also detects the film speed of the film cartridge 40 loaded into the camera 10 using a film unit detector 124 and relays this information to the controller 81. The camera 10 obtains scene brightness (Bv) from components, discussed below, that function as a light meter. The scene brightness and other exposure parameters are provided to an algorithm in the controller 81, which determines a focused distance, shutter speeds, apertures, and optionally a gain setting for amplification of the analog signal provided by the imager 24. Appropriate signals for these values are sent to the drivers 88,100,108,110,112 via a motor driver interface (not shown) of the controller 81. The gain setting is sent to the ASP-A/D converter 104.

The camera 10 assesses ambient lighting using the imager 24 or a separate detector 126 (indicated by dashed lines in the figures) or both. The detector has an ambient detector driver 128 that operates a single sensor 129 or multiple sensors (not shown). The term "sensor" is inclusive of an array of sensors. Sensors are referred to here as being "single" or "multiple" based on whether the ambient light detection separately measures light received from different parts of the ambient area. A "single sensor" may have separate photodetectors for different colors. The ambient light detector or sensors can receive light from the taking lens 76 or can be illuminated externally.

In some embodiments, the electronic capture unit 16 is used to assess ambient lighting. In those embodiments, one or more electronic images are captured prior to capture of the archival image. The captured electronic image data from one or more of these preliminary images is sampled and scene parameters, such as automatic setting of shutter speeds and diaphragm settings, are determined from that data. These preliminary electronic images can be captured in a continuing sequence as long as the capture system 14 is in a preliminary mode. For example, preliminary images can be captured, seriatim, as long as the shutter release 22 is actuated through the first stroke and is maintained in that position. This capture of preliminary images ends when the shutter release 22 is returned to a stand-by position or is actuated through the second stroke for archival image capture. The preliminary electronic images could be saved to memory 54; but, except as otherwise described here, are ordinarily discarded, one after another, when the replacement electronic image is captured to reduce memory usage. The preliminary images can also be provided to the image display 26 for use by the photographer, prior to picture taking, in composing the picture. This use of the image display 26 as an electronic viewfinder greatly increases energy usage and is generally not preferred for that reason.

The electronic capture unit 16 is calibrated during assembly, to provide measures of illumination, using known values. For example, the controller 81 can process the data presented in a preliminary image using the same kinds of light metering algorithms as are used for multiple spot light meters. The procedure is repeated for each succeeding preliminary image. Individual pixels or groups of pixels take the place of the individual sensors used in the multiple spot light meters. For example, the controller 81 can determine a peak illumination intensity for the image by comparing pixel to pixel until a maximum is found. Similarly, the controller 81 can determine an overall intensity that is an arithmetic average of all of the pixels of the image. Many of the metering algorithms provide an average or integrated value over only a selected area of the imager array 24, such as an upper middle region. Another approach is to evaluate multiple areas and weigh the areas differently to provide an overall value. For example, in a center weighted system, center pixels are weighted more than peripheral pixels. The camera 10 can provide manual switching between different approaches, such as center weighted and spot metering. The camera 10 can alternatively, automatically choose a metering approach based on an evaluation of scene content. For example, an image having a broad horizontal bright area at the top can be interpreted as sky and given a particular weight relative to the remainder of the image.

Under moderate lighting conditions the imager 24 can provide light metering and color balance determination from a single preliminary image. More extreme lighting conditions can be accommodated by use of more than one member of the series of preliminary electronic images while varying exposure parameters until an acceptable electronic image has been captured. The manner in which the parameters are varied is not critical.

The following approach is convenient. When an unknown scene is to be measured, the imager 24 is set to an intermediate gain and the image area of interest is sampled. If the pixels measure above some upper threshold value (TH) such as 220, an assumption is made that the gain is too high and a second measurement is made with a gain of one-half of the initial measurement (1 stop less). (The values for TH and TL given here are by way of example and are based on 8 bits per pixel or a maximum numeric value of 255.) If the second measurement provides a code value corresponding to approximately one-half the previous measured sensor illumination level, it is assumed that the measurement is accurate and representative. If the second measurement is still above TH, the process is repeated until a measurement is obtained that has a value that is one-half that of the preceding measurement. If the initial measurement results in a value less than a low threshold (TL) such as 45, the gain is doubled and a second measurement made. If the resultant measurement is twice the first measurement, it is assumed that the measurement is accurate and representative. If this is not the case, then the gain is doubled again and the measurement is repeated in the same manner as for the high threshold. Exposure parameters, such as aperture settings and shutter speeds can be varied in the same manner, separately or in combination with changes in gain. In limiting cases, such as full darkness, the electronic image capture unit is unable to capture an acceptable image. In these cases, the controller 81 or another component can provide a warning message to the user that the camera 10 cannot provide appropriate settings under the existing conditions.

After the controller 81 receives the scene brightness value, the controller 81 compares scene brightness to a flash trip point. If the light level is lower than the flash trip point, then the controller 81 enables full illumination by the flash unit 36, unless the user manually turned the flash off. Appropriate algorithms and features for these approaches are well known to those of skill in the art.

A second switch S2 actuates when the shutter release 22 is further pushed to a second stroke. When the second switch S2 actuates, the film shutter 92 is tripped and the capture of the latent image exposure on the film frame begins. The film shutter 92 momentarily opens for a duration referred to herein as an "archival image exposure time interval". The imager shutter 94 is also actuated and momentarily opens one or more times during the archival image exposure time interval.

The body 12 has an entrance opening 130 in the front cover 28 and an exit opening 132 in the rear cover 30. Referring now mostly to FIGS. 1–13, extending inward from the entrance and exit openings 130,132, are an entrance tunnel 134 and an exit tunnel 136, respectively. The entrance and exit tunnels 134,136 are offset from each other in a direction perpendicular to the optical axis 138 of the taking lens 76. A cross tunnel 140 extends between the entrance and exit tunnels 134,136. In the embodiments illustrated in the figures, the tunnels 134,136,140 are parts of the frame 32.

The tunnels 134,136,140 and related components provide a multiple-use optical and electronic viewer 14. The viewer 14 includes an optical eyepiece 142 that is mounted, in the exit tunnel 136 at the exit opening 132 and an objective lens 144 that is mounted, in the entrance tunnel 134 at the entrance opening 130. The eyepiece 142 defines an eyepiece axis 146. The objective lens 144 defines an objective axis 148. The objective lens 144 can be a zoom lens. In that case, the objective lens 144 is operated by a zoom driver 78 in the same manner as the taking lens 76. In some embodiments, the objective lens 144 is independent of the taking lens 76 of an archival capture unit.

The viewer 14 can include an electronic imager 24 and/or a microdisplay 26b, also mounted within the tunnels. The viewer 14 preferably includes both. The electronic imager 24 is mounted in optical alignment with the objective lens 144. The microdisplay 26b is mounted in the exit tunnel 136 and is aligned with the eyepiece 142. In the embodiments of FIGS. 1–9, the imager 24 and microdisplay 26b are aligned with the objective axis 148 and eyepiece axis 146, respectively.

In a real-image-forming viewfinder, such as discussed here, the objective lens forms an intermediate real image within the system. This real image effectively acts as an "object" for the eyepiece, which subsequently forms a virtual image at some comfortable distance away for viewing by the eye. The combination of these two lens systems with the prisms or mirrors that are in the system, properly orients the viewed image so that it corresponds to the orientation of the true scene as viewed by the naked eye.

In the preferred embodiment, the imager described herein is located at a position which is the same "equivalent air thickness" from the objective lens as the intermediate image 153 (shown in FIG. 6) is from the objective lens. (Note that equivalent air thickness=physical thickness/refractive index.) In this way, no additional optics or focusing are required when switching from optical-viewing mode to electronic image capture mode. Likewise, in the interest of functionality and efficiency, the effective size (height and width dimensions) of the imager is preferably the same as that of the intermediate image. (The "effective size" of the imager refers to the active area; inactive pixels, support structure and the like are not considered.) In this way, no additional optics are required to ensure the scene fits properly into the active area of the imager, when switching from optical-viewing mode to electronic image capture mode.

The same holds true for the eyepiece. Here, in a similar fashion, the microdisplay is preferably located at a position which is the same equivalent air thickness from the eyepiece as the intermediate image is from the eyepiece. Likewise, the effective size (height and width dimensions) of the microdisplay is preferably the same as that of the intermediate image. (The "effective" size again refers to the active area.)

The above preferred embodiments are not requirements. The imager and the microdisplay can be any practical size and at any practical distances relative to the objective lens and eyepiece, respectively. Doing so, however, can require the use of additional optical element(s) to bring images into focus at the proper distances and/or scales, or can result in underfilling or overfilling the imager, or can result in using only a fraction of the microdisplay, or can result in the microdisplay image appearing larger/smaller than the scene image (viewed via the intermediate image), or some combination of these effects. If any of these results can be tolerated by a particular application, then solutions incorporating them are acceptable.

First and second reflectors 150,152 are disposed in the cross tunnel 140. Each reflector is a mirror or prism or a compound mirror or prism or a combination of mirrors and prisms. "Compound" or "combination" as the terms are used herein, refers to a component that has more than one reflecting surface but functions as a single unit, such as an Abbe Porro prism (which has four reflecting surfaces). "Reflectors" as the term is used herein, are fully reflective, unless specifically indicated otherwise. One or both reflectors 150,152 are movable within the cross tunnel 140 between a respective optical-viewing position and a non-viewing position. In the embodiment of FIGS. 1–9, the first and second reflectors 150,152 are both (identical) prisms. Each prism is essentially half of an Abbe Porro prism, with an air gap in between (in which space an intermediate real image is formed). Within each of these two prisms, reflection occurs twice, once at-each of two 45-degree diagonal surfaces. Reflection at these surfaces may be achieved via total internal reflection (TIR) if the light ray angles are shallow enough to permit this. Alternatively, if the ray angles are such that TIR does not occur for all rays, these surfaces may be given a mirrored coating to provide the reflection. In either case, the functionality of these prisms is the same— namely, to orient the image properly for optical viewfinding and, through their movement, redirect the light in other desirable ways (that is, from the objective to the imager, from the electronic display to the eye, and so on). The first reflector 150 is aligned with the objective axis 148 and the second reflector 152 is aligned with the eyepiece axis 146, in the respective optical-viewing positions. The reflectors 150,152 are spaced from the respective axes 148,146 and from each other in respective non-viewing positions.

It should be noted that while a prism arrangement may in some cases be more costly than a mirror arrangement, there can be technical and system advantages to the former, which may thereby reduce the size or cost of the overall imaging system. In fact, there can be a substantial advantage to using plastic or glass prisms rather than simple air-spaced mirrors as reflectors/erectors in all of the embodiments described herein. The benefits arise namely from the refractive index of the plastic/glass compared to that of air (typically 1.45–2.00 vs. 1.00). The equivalent air thickness of a prism made from one of these materials is thereby 30–50% less than that of a hollow "prism" constructed from air-spaced mirrors. (As earlier noted, equivalent air thickness=physical thickness/refractive index.) This provides two things: 1) it reduces the required space volume for folding a given cone of light, and 2) it shortens the required back focal distance (BFD) for both the objective lens and the eyepiece. BFD is known to be a substantial cost-driver in optical designs by those skilled in the art. Reducing this by 30–50% is advantageous in terms of simplifying the lens design and can also reduce space requirements.

The cross tunnel 140 is shaped so as to accommodate the movable reflector or reflectors 150,152. Additional space is provided in the cross tunnel 140 between the entrance and exit tunnels 134,136 or in the form of one or more outwardly extending blind chambers 154. The blind chamber 154 or other added space holds one of the reflectors 150,152 in a non-viewing position. In the embodiment of FIGS. 1–9, both reflectors 150,152 are movable and are movable relative to each other within the cross tunnel 140. There are a pair of opposed blind chambers 154 at the longitudinal ends of the cross tunnel 140 that hold the two reflectors 150,152 in respective non-viewing positions.

A field stop or shield 156 is disposed in the cross tunnel 140 between the reflectors 150,152. The field stop 156 is a plate having an opening 158 and a blocking portion 160 longitudinally spaced from the opening 158. The field stop 156 is movable foreword and back across the cross tunnel 140 between first and second positions. In the first position, the field stop 156 opening permits passage of the image from the first reflector 150 to the second reflector 152. Incidental light from other directions is blocked. In the second position, the blocking portion 160 of the field stop 156 is disposed between the reflectors 150,152, occluding the cross tunnel 140 between the entrance and exit tunnels 134,136.

In the embodiment of FIGS. 1–9, the entrance tunnel 134 has a blind end 162 that is rearward from the cross tunnel 140 and the exit tunnel 136 has a blind end 164 forward of the cross tunnel 140. The imager 24 and microdisplay 26b are disposed in respective blind ends 162,164.

It is preferred for ease of optical viewfinder usage, that an erecting element, such as an erecting prism, is disposed optically between the objective lens 144 and the eyepiece 142. The use of erecting elements is conventional since it allows the reviewed image to be right side up and correct in left-right orientation. In the embodiment of FIGS. 1–6 the two prisms together form an erecting element. (See FIG. 6.)

Figure 3:
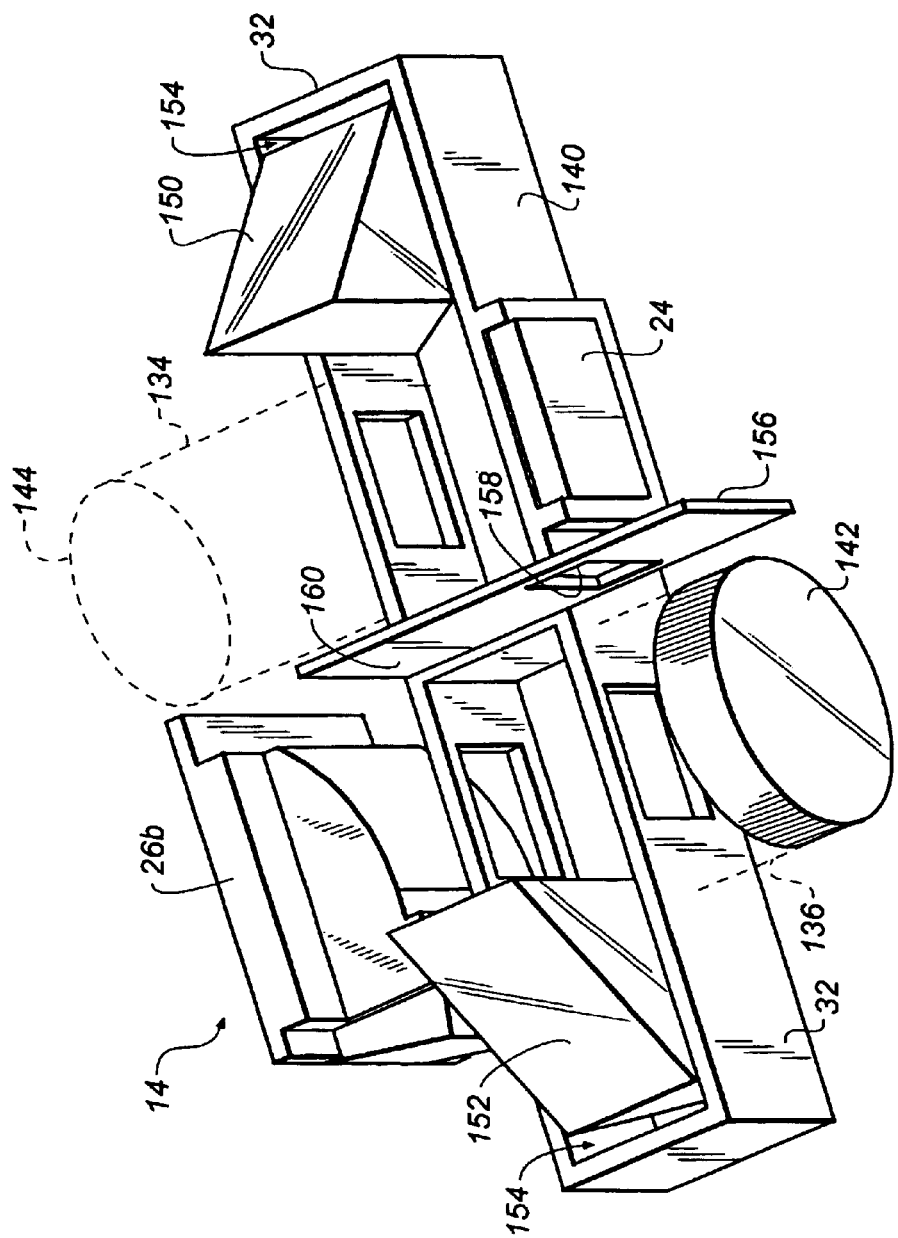
FIG. 3 is the same view as FIG. 1, but the reflectors are shown in non-viewing position allowing viewing of the microdisplay.
Figure 4:
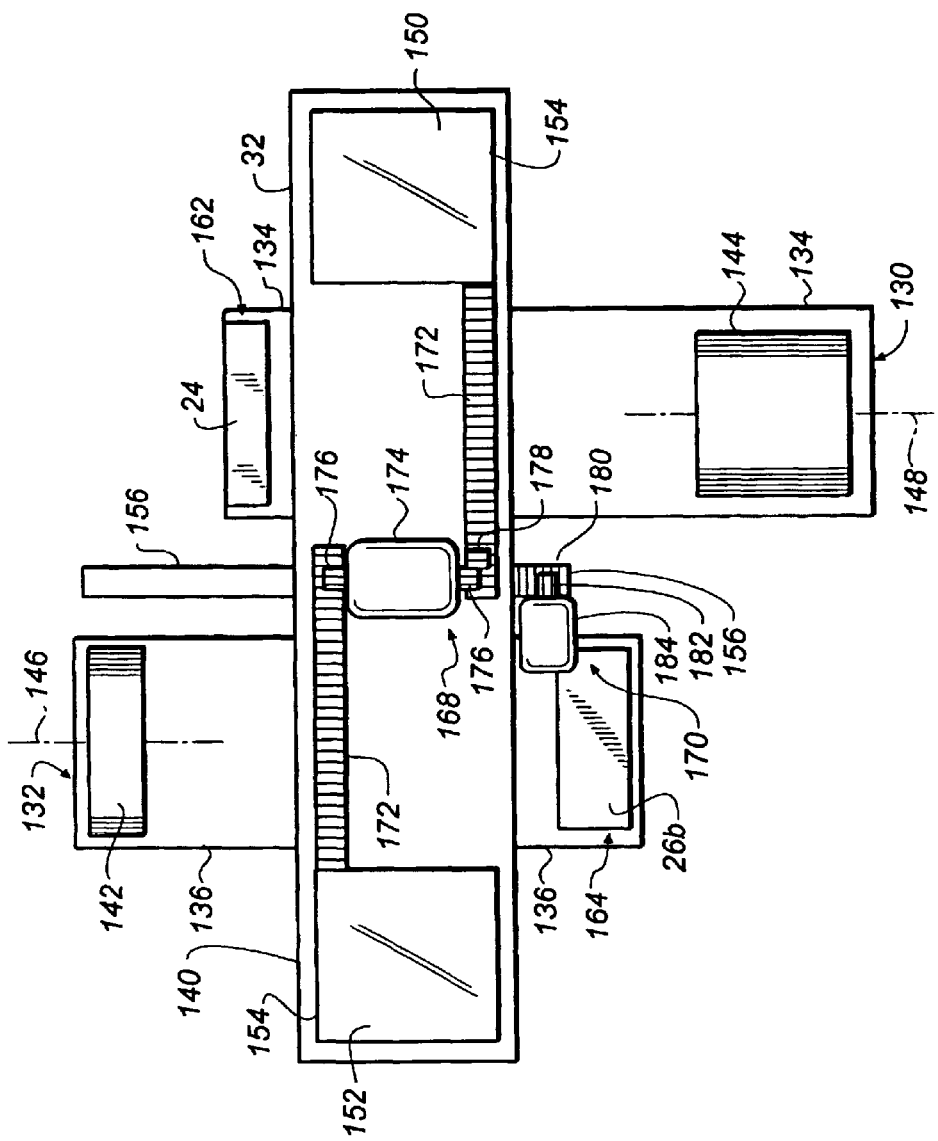
FIG. 4 is the same view as the FIG. 2, but the reflectors are shown in the non-viewing position.
Figure 6:
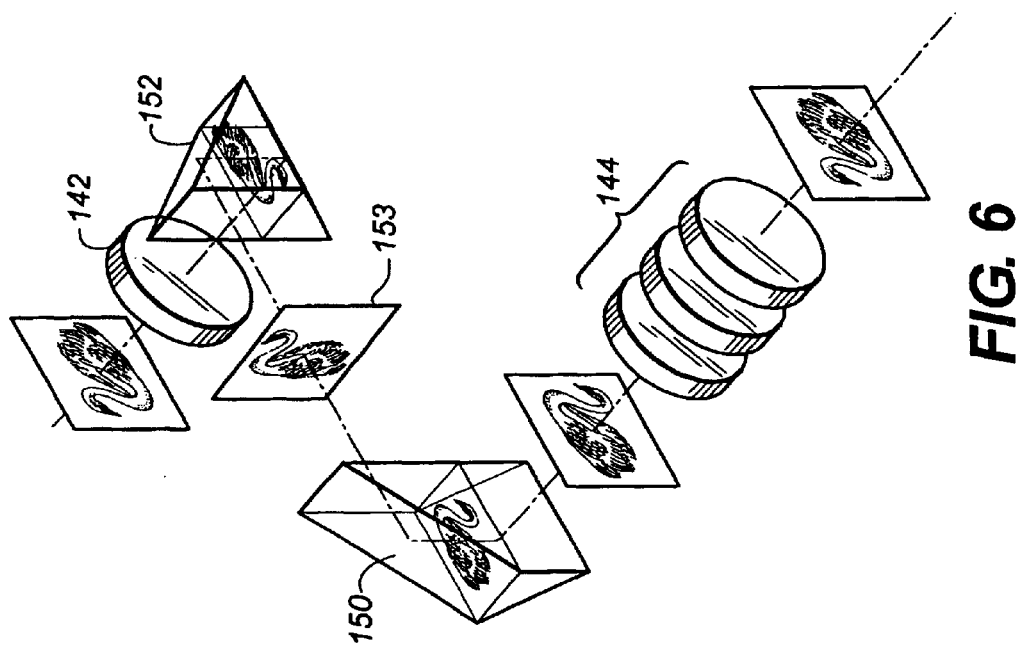
FIG. 6 is a diagrammatical perspective view of some of the optical components of the viewer of FIG. 1. The reflectors are in the optical-viewing position and a scene image is illustrated at different stages in the optical path to show changes in orientation.
Figure 5:
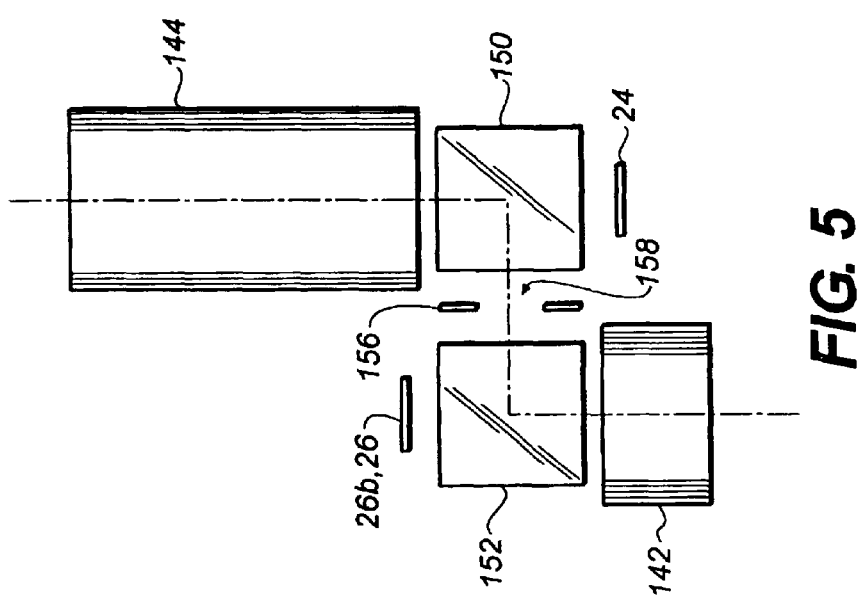
FIG. 5 is a diagrammatical top view of the viewer of FIG. 1. The reflectors are in the optical-viewing position.
Figure 7:
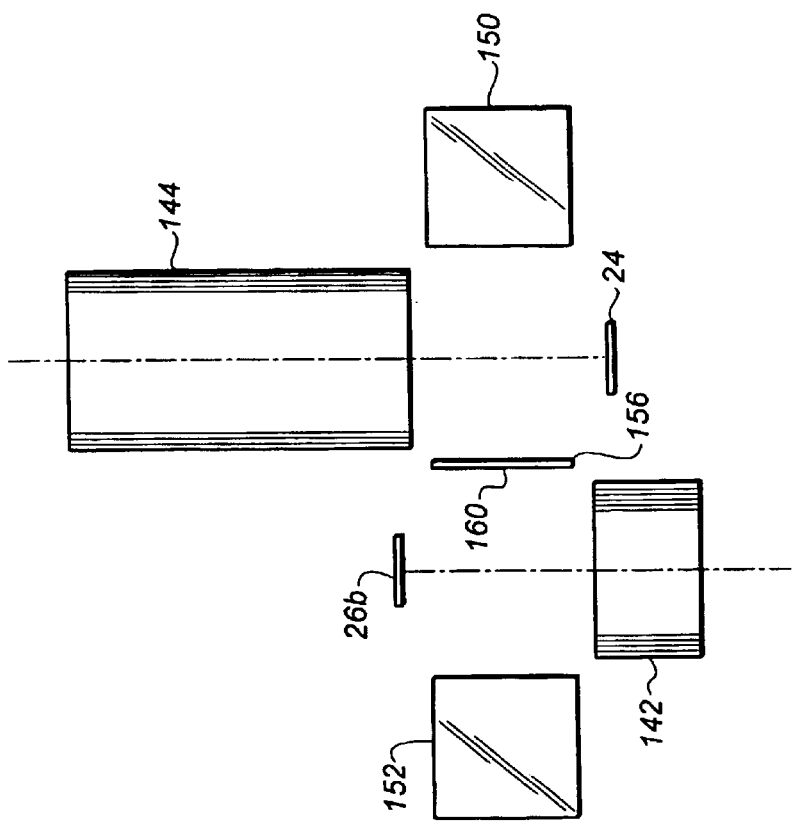
FIG. 7 is the same view as FIG. 5, but the reflectors are in the non-viewing position. The electronic imager and microdisplay are both usable and either can be used or both can be used together as an electronic viewfinder.

The function of the viewer 14 depends upon the positions of the reflectors 150,152. Referring initially to the FIGS. 1–2 and 5, the first and second reflectors 150,152 are each in respective optical-viewing positions and the viewer 14 is used as an optical viewfinder. Light that enters through the objective is redirected by the reflectors 150,152 and exits through the eyepiece 142 to the user. FIGS. 3–4 and 7 illustrate the same embodiment, but with the two reflectors 150,152 in respective non-viewing positions. Light entering through the objective strikes the imager 24. A display image presented on the microdisplay 26b is propagated through the eyepiece 142 to the user. The field stop 156 is in a blocking position, in which passage of light through the cross tunnel 140 is precluded.

Figure 8:
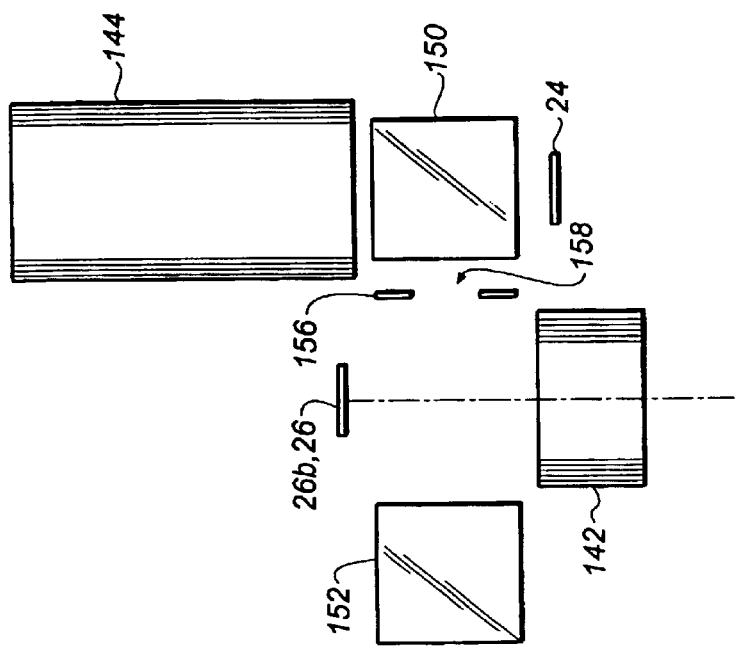
FIG. 8 is a diagrammatical top view of another embodiment of the viewer. The reflectors are in a display position, in which the microdisplay can be viewed.
Figure 9:
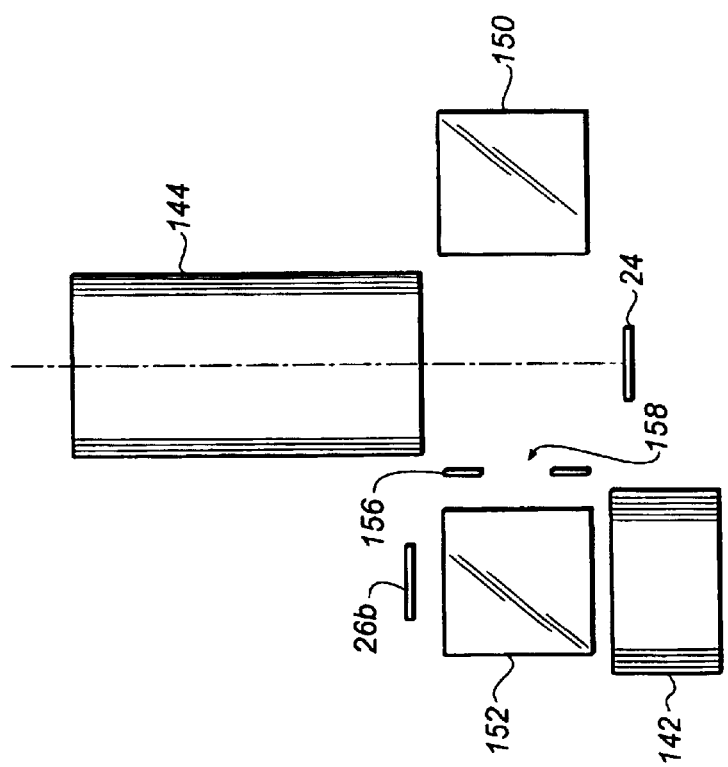
FIG. 9 is the same view as FIG. 8, but the reflectors are in image capture position.

FIGS. 8–9 illustrate a modification of the embodiment of FIG. 1. In this case, only one reflector is moved at a time. The reflectors 150,152 are positioned as in FIG. 5 for optical-viewing. In FIG. 8, the second reflector 152 is in the non-viewing position and the first reflector 150 is in the optical-viewing position. The user can see the microdisplay 26b but no image is propagated through the objective to the imager 24. The field stop 156 can be moved to the blocking position to prevent light entry via the first reflector 150. In FIG. 9, the first reflector 150 is in the non-viewing position and the second reflector 152 remains in the optical-viewing position. In this case, light is propagated through the objective lens 144 to the imager 24, but the user is unable to view an image. Light blocking by the field stop 156 is not essential, but may be desirable to reduce stray light reaching the eye.

Figure 10:
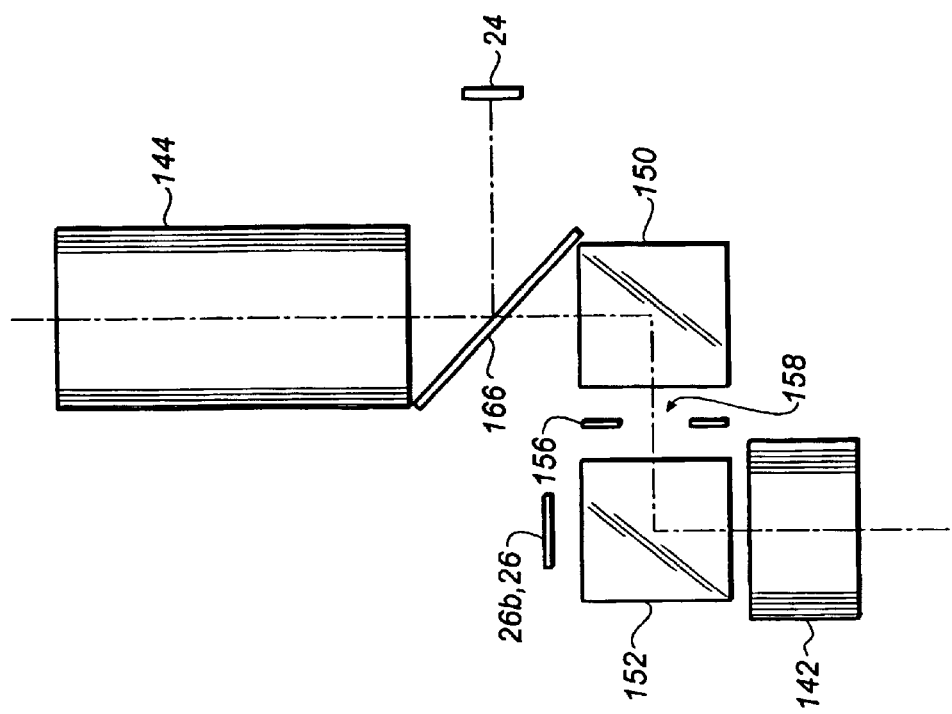
FIG. 10 is a diagrammatical top view of another embodiment of the viewer. Reflectors are in image capture/optical-viewing position.
Figure 11:
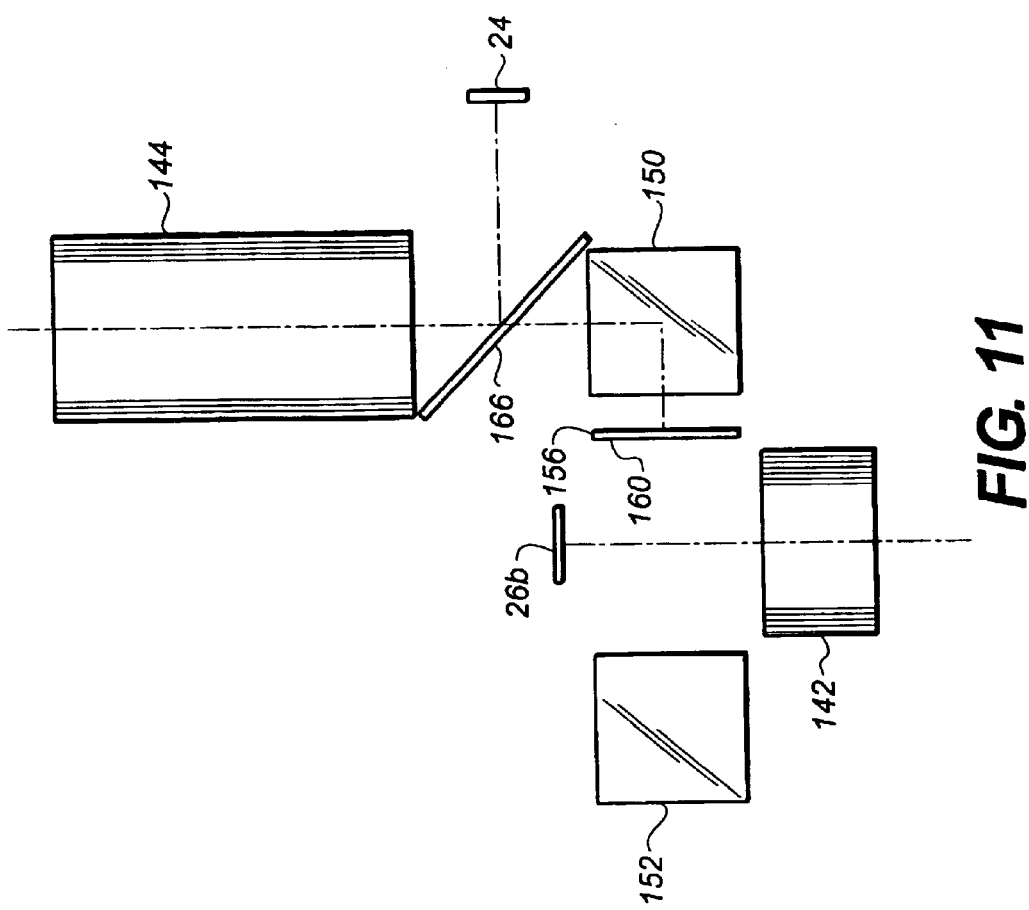
FIG. 11 is the same view as FIG. 9, but shows the embodiment of FIG. 10, with the reflectors in display position, in which the microdisplay can be viewed.

Now referring to FIGS. 10–11, in a modification of the viewer 14 of FIGS. 1–7, a partially transmissive mirror 166 is added between the objective lens 144 and the first reflector 150. The imager 24 is relocated so as to be aligned with the reflection from the partially transmissive mirror 166. FIG. 10 illustrates the first and second reflectors 150,152 in the optical-viewing position. FIG. 11 illustrates another state in which the second reflector 152 is in the non-viewing position and the first reflector 150 remains in the optical-viewing position. In this case, the imager 24 receives an image from the semi-reflective mirror 166 and the microdisplay 26b propagates a display image to the user through the eyepiece 142.

Figure 19:
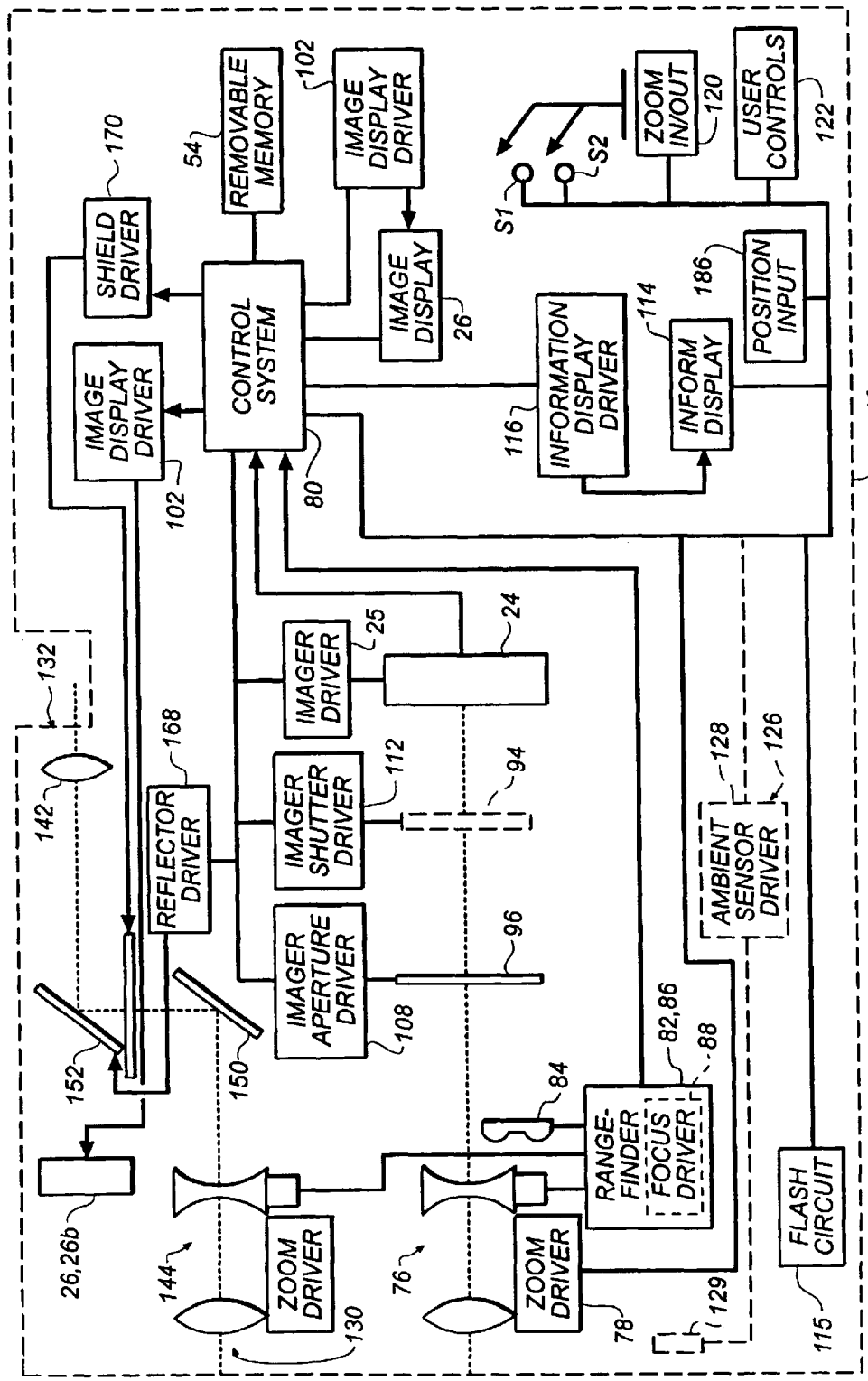
FIG. 19 is a schematic diagram of still another embodiment of the camera. A reflector is in optical-viewing position.

Referring now to FIG. 19, in another embodiment, a taking lens 76 directs a scene image to the imager 24 of an archival electronic capture unit. The taking lens 76 is oriented in the same direction, but independent of the objective lens 144. Thus, the imager 24 receives the scene image independently of the objective lens 144. The objective lens 144 directs the scene image to a first reflector 150 that can be non-movable or can move in the manner earlier discussed. In an optical-viewing position, the second reflector 152 reflects the light image to the eyepiece 142. The second reflector 152 is movable to a non-viewing position, as earlier discussed, to permit direct viewing of a microdisplay 26b, which is operatively connected to show the images captured by the imager 24.

Figure 12:
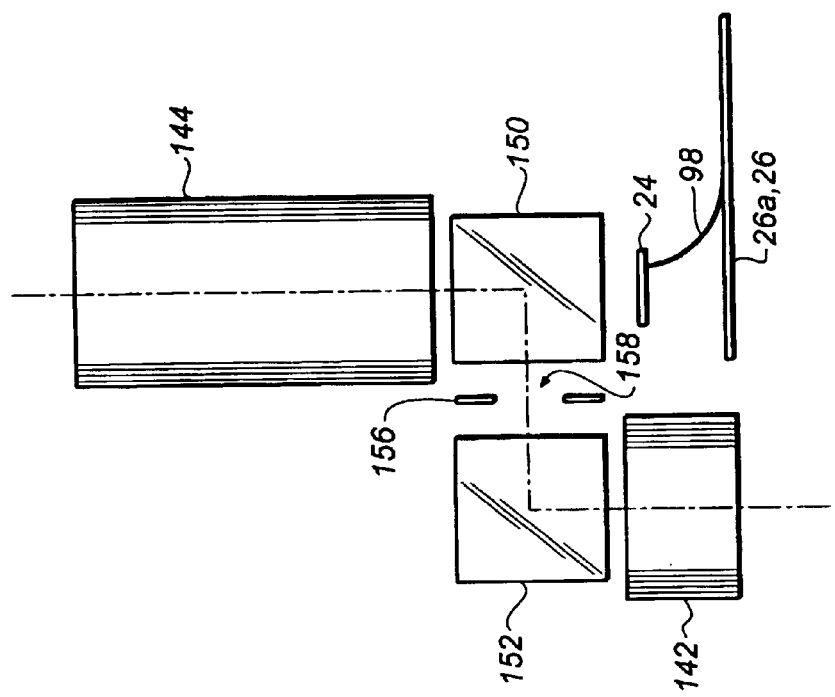
FIG. 12 is a diagrammatical top view of another embodiment of the viewer. Reflectors are in optical-viewing position.
Figure 13:
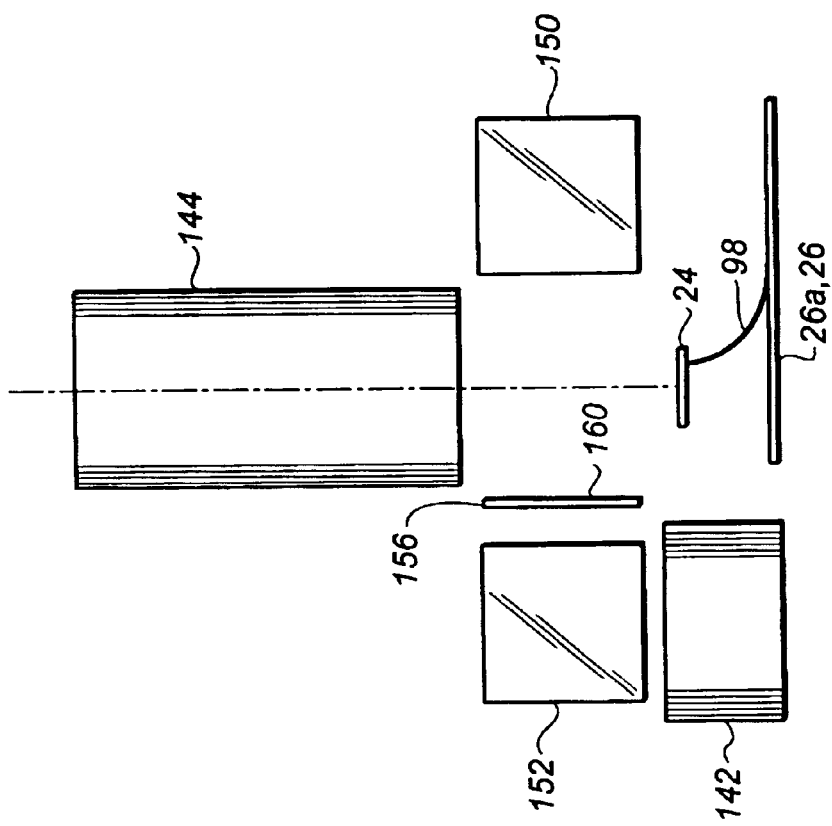
FIG. 13 is the same view as FIG. 12, but the reflectors are in image capture/display position, in which the imager can be used to capture an electronic image and the display can be viewed.

Another modification of the viewer 14 is shown in FIGS. 12–13. In this case, the microdisplay 26b is replaced by an external display 26a mounted to the outside of the body 12. In a first state shown in FIG. 12, both reflectors 150,152 are in respective optical-viewing positions. In a second state shown in FIG. 13, the second reflector 152 is unmoved and the first reflector 150 is in a non-viewing position. The objective lens 144 transmits light to the imager 24 and a display image can be shown on the external display 26b. The eyepiece 142 is nonfunctional in the second state.

The reflectors 150,152 can be moved in other manners than those illustrated and the cross tunnel 140 modified to accommodate such movement. For example, the cross tunnel 140 can be lengthened between the entrance tunnel 134 and exit tunnel 136 and both reflectors 150,152 can be movable into the added length of cross tunnel 140 between the entrance and exit tunnels 134,136. Alternatively, one of the reflectors 150,152 can be movable outward along the cross tunnel 140 beyond one of the entrance and exit tunnels 134,136 and the other reflector can be movable into the added space between the entrance and exit tunnels 134,136. The cross tunnel 140 can instead or additionally be modified to have one or more blind pockets that are arranged perpendicular to the longitudinal axis of the cross tunnel 140 (above or below in FIG. 1). In this case, one or both reflectors 150,152 can be moved into such a pocket. The reflectors 150,152 are generally described herein as being movable independent of each other. The reflectors 150,152 can instead be joined together so as to move as a unit and the cross tunnel 140 can be modified, as necessary, to permit such movement. Movement is illustrated as being rectilinear, but one or both reflectors 150,152 can instead pivot or move in some other manner.

The reflectors 150,152 are movable between the various positions by the reflector driver or prism driver 168. The shield 156 is movable between positions by a shield driver 170. The reflector driver and shield driver can provide for manual or automatic movement of the reflectors 150,152 and shield 156. For example, individual stepper motors or servomotors with appropriate feedback systems can be used for drivers 168,170. In the embodiment illustrated in FIGS. 2 and 4, the reflector driver includes a pair of racks 172 that are joined to the reflectors 150,152. The racks 172 extend toward each other. The driver 168 also includes an electric motor 174 that is positioned between the racks 172. The electric motor 174 has a shaft (not shown) having a pinion 176 at each end. One pinion 176 is meshed with the adjoining rack 172. The other pinion 176 meshes with a reversing gear 178 that is, in turn, meshed with the adjoining rack 172. The motor 174 is operated in one direction or the other to move the reflectors 150,152 toward or away each other. Travel stops or the like (not shown) can be provided to limit travel. The shield 156 can be operated in the same manner. The shield 156 has a rack 180 along a bottom edge. The pinion 182 of a motor 184 is meshed with the rack 180. Other arrangements of racks and pinions, gear trains, belts, and the like will be apparent to those of skill in the art.

The shield driver 170 and prism driver 168 are operated by the control system 80 to change the positions of the reflectors 150,152 and shield 156 as needed automatically or as manually selected. It is convenient if the camera 10 provides a user control 186, labeled in FIGS. 16 and 18 as "position input", which the photographer can actuate to change the positions of the reflectors 150,152 and shield 156.

The invention has been described in detail with particular reference to certain preferred embodiments thereof, but it will be understood that variations and modifications can be effected within the spirit and scope of the invention.

What is claimed is:

1. An optical and electronic viewer comprising:

a body having entrance and exit openings;

an eyepiece mounted at said exit opening, said eyepiece defining an eyepiece axis;

an objective lens mounted at said entrance opening, said objective lens defining an objective axis;

an electronic imager disposed within said body, in optical alignment with said objective lens;

a microdisplay disposed in said body, in optical alignment with said eyepiece;

first and second reflectors disposed in said body, said reflectors being aligned, said reflectors each being movable between an optical-viewing position and a non-viewing position, said first reflector being aligned with said objective axis and said second reflector being aligned with said eyepiece axis in respective said optical-viewing positions, said reflectors being spaced from said axes and each other in respective said non-viewing positions.

2. The viewer of claim 1 wherein said objective lens forms an intermediate image between said reflectors, and said intermediate image is at the same equivalent air thickness from said objective lens in said optical-viewing position, as said imager is from said objective lens in said non-viewing position.

3. The viewer of claim 2 wherein said intermediate image is at the same equivalent air thickness from said eyepiece in said optical-viewing position, as said microdisplay is from said eyepiece in said non-viewing position.

4. The viewer of claim 3 wherein said imager has an effective size that is the same as the size of said intermediate image and said microdisplay has an effective size that is the same as the size of said intermediate image.

5. The viewer of claim 1 wherein said imager has an effective size that is the same as the size of said intermediate image and said microdisplay has an effective size that is the same as the size of said intermediate image.

6. An optical and electronic viewer comprising:
a body having entrance and exit openings and entrance and exit tunnels extending inward from respective said entrance and exit openings, said body having a cross tunnel connecting said entrance and exit tunnels;
an eyepiece mounted in said exit tunnel at said exit opening, said eyepiece defining an eyepiece axis;
an objective lens mounted in said entrance tunnel at said entrance opening, said objective lens defining an objective axis and a scene image;
an electronic imager disposed within said body, said imager receiving said scene image;
first and second reflectors disposed in said cross tunnel, at least one of said reflectors being movable, within said cross tunnel, between an optical-viewing position, wherein said first reflector is aligned with said objective axis and said second reflector is aligned with said eyepiece axis, and a non-viewing position, wherein at least one of said reflectors is spaced from the respective said axis; and
a beam splitter disposed in said entrance tunnel between said objective lens and said first reflector, said beam splitter defining a first light path to said first reflector and a second light path to said imager.

7. An optical and electronic viewer comprising:
a body having entrance and exit openings and entrance and exit tunnels extending inward from respective said entrance and exit openings, said body having a cross tunnel connecting said entrance and exit tunnels;
an eyepiece mounted in said exit tunnel at said exit opening, said eyepiece defining an eyepiece axis;
an objective lens mounted in said entrance tunnel at said entrance opening, said objective lens defining an objective axis and a scene image;
an electronic imager disposed within said body, said imager receiving said scene image;
first and second reflectors disposed in said cross tunnel, at least one of said reflectors being movable, within said cross tunnel, between an optical-viewing position, wherein said first reflector is aligned with said objective axis and said second reflector is aligned with said eyepiece axis, and a non-viewing position, wherein at least one of said reflectors is spaced from the respective said axis; and
a taking lens optically aligned with said imager, wherein said imager receives said scene image independently of said objective lens.

8. The viewer of claim 7 further comprising a microdisplay disposed in said exit tunnel interior to eyepiece, said microdisplay being optically aligned with said eyepiece, said microdisplay being operatively connected to said imager.

9. An optical and electronic viewer comprising:
a body having entrance and exit openings and entrance and exit tunnels extending inward from respective said entrance and exit openings, said body having a cross tunnel connecting said entrance and exit tunnels;
an eyepiece mounted in said exit tunnel at said exit opening, said eyepiece defining an eyepiece axis;
an objective lens mounted in said entrance tunnel at said entrance opening, said objective lens defining an objective axis;
an electronic imager disposed within said body, in optical alignment with said objective lens;
first and second reflectors disposed in said cross tunnel, said reflectors being aligned, said reflectors each being movable, within said cross tunnel, between an optical-viewing position and a non-viewing position, said first reflector being aligned with said objective axis and said second reflector being aligned with said eyepiece axis in respective said optical-viewing positions, said reflectors being spaced from said axes and each other in respective said non-viewing positions.

10. The viewer of claim 9 wherein said objective lens forms an intermediate image between said reflectors, and said intermediate image is at the same equivalent air thickness from said objective lens in said optical-viewing position, as said imager is from said objective lens in said non-viewing position.

11. The viewer of claim 10 wherein in said imager has an effective size that is the same as the size of said intermediate image.

12. The viewer of claim 10 further comprising a microdisplay mounted in said exit tunnel interior to eyepiece, said microdisplay being optically aligned with said eyepiece.

13. The viewer of claim 12 wherein said intermediate image is at the same equivalent air thickness from said eyepiece in said optical-viewing position, as said microdisplay is from said eyepiece in said non-viewing position.

14. The viewer of claim 13 wherein in said microdisplay displays an image that is the same size as said intermediate image.

15. The viewer of claim 14 wherein in said imager has an effective size that is the same as the size of said intermediate image.

16. The viewer of claim 9 further comprising a microdisplay mounted in said exit tunnel interior to eyepiece, said microdisplay being optically aligned with said eyepiece.

17. The viewer of claim 16 wherein said objective lens forms an intermediate image between said reflectors, and said intermediate image is at the same equivalent air thickness from said eyepiece in said optical-viewing position, as said microdisplay is from said eyepiece in said non-viewing position.

18. The viewer of claim 17 wherein in said microdisplay displays an image that is the same size as said intermediate image.

19. The viewer of claim 9 further comprising a display mounted on the exterior of said body.

20. The viewer of claim 9 wherein said objective lens forms an intermediate image between said reflectors, and said imager has an effective size that is the same as the size of said intermediate image.

21. The viewer of claim 20 wherein in said microdisplay displays an image that is the same size as said intermediate image.

22. The viewer of claim 20 wherein said reflectors together function as erecting element disposed optically between said objective lens and said eyepiece.

23. The viewer of claim 9 wherein said entrance tunnel has a blind end rearward of said cross tunnel and said imager is disposed in said end of said entrance tunnel.

24. The viewer of claim 9 wherein said reflectors are both prisms.

25. The viewer of claim 9 wherein said reflectors are identical prisms.

26. The viewer of claim 9 wherein said reflectors are prisms having at least one mirror coated surface.

27. The viewer of claim 9 wherein said reflectors are movable relative to each other within said cross tunnel.

28. The viewer of claim 9 wherein said cross tunnel has an outwardly extending blind chamber and said non-viewing position of one of said reflectors is in said blind chamber.

29. The viewer of claim 28 wherein said cross tunnel has a longitudinal axis and said blind chamber is aligned with said longitudinal axis.

30. The viewer of claim 9 further comprising a field stop having an opening and a light blocking portion spaced from said opening, said field stop being movable between a first position, wherein said opening is disposed in said cross tunnel between said reflectors, and a second position, wherein said light blocking portion is disposed in said cross tunnel between said reflectors.

31. The viewer of claim 9 further comprising an archival capture unit disposed in said body, said archival capture unit being oriented in the same direction as said objective lens.

32. A camera comprising:
 a body having an entrance and exit openings and entrance and exit tunnels extending inward from respective said entrance and exit openings, said body having a cross tunnel connecting said entrance and exit tunnels;
 an eyepiece mounted in said exit tunnel at said exit opening, said eyepiece defining an eyepiece axis;
 an objective lens mounted in entrance tunnel at said entrance opening, said objective lens defining an objective axis;
 an electronic imager mounted in said entrance tunnel interior to and in optical alignment with said objective lens;
 a microdisplay mounted in said exit tunnel interior to and optically aligned with said eyepiece;
 memory operatively connected to said imager and said microdisplay;
 first and second reflectors disposed in said cross tunnel, said reflectors being aligned, said reflectors each being movable, within said cross tunnel, between an optical-viewing position and a non-viewing position, said first reflector being aligned with said objective axis and said second reflector being aligned with said eyepiece axis in respective said optical-viewing positions, said reflectors being spaced from said axes and each other in respective said non-viewing positions.

33. A view and review method comprising the steps of:
 directing a light image through an objective lens to an entrance tunnel;
 reflecting said light image from said entrance tunnel to a cross tunnel and from said cross tunnel to an exit tunnel having an eyepiece;
 propagating a display image from a microdisplay directly into said exit tunnel and from said exit tunnel to said eyepiece, in alternation with said reflecting.

34. The method of claim 33 wherein said objective lens defines an objective axis and said eyepiece defines an eyepiece axis, said axes being parallel.

35. The method of claim 33 further comprising propagating said light image to an electronic imager, in alternation with said reflecting.

36. The method of claim 33 further comprising optically erecting said light image.

37. An optical and electronic viewer comprising:
 means for directing a light image through an objective lens to a cross tunnel, said objective lens defining an objective axis;
 means for redirecting said light image from said cross tunnel to an eyepiece, said eyepiece defining an eyepiece axis, said axes being parallel;
 means for directing a display image from a microdisplay, across said cross tunnel, to said eyepiece, in alternation with said redirecting; and
 means for propagating said light image across said cross tunnel to an electronic imager, in alternation with said redirecting.

38. The method of claim 33 further comprising propagating said light image from said objective lens to an electronic imager, along an objective axis extending through said objective lens and said electronic imager, in alternation with said reflecting.

39. A view and review method comprising the steps of:
 directing a light image through an objective lens to a cross tunnel, said objective lens defining an objective axis;
 redirecting said light image from said cross tunnel to an eyepiece, said eyepiece defining an eyepiece axis, said axes being parallel;
 directing a display image from a microdisplay, across said cross tunnel, to said eyepiece, in alternation with said redirecting; and
 propagating said light image across said cross tunnel to an electronic imager, in alternation with said redirecting.

* * * * *